(12) United States Patent
Yoshida

(10) Patent No.: US 9,832,551 B2
(45) Date of Patent: Nov. 28, 2017

(54) OPTICAL TRANSMISSION DEVICE AND OPTICAL TRANSMISSION CONTROL METHOD

(71) Applicant: FUJITSU LIMITED, Kawasaki-shi, Kanagawa (JP)

(72) Inventor: Hiroshi Yoshida, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/000,400

(22) Filed: Jan. 19, 2016

(65) Prior Publication Data
US 2016/0261934 A1 Sep. 8, 2016

(30) Foreign Application Priority Data
Mar. 4, 2015 (JP) .................. 2015-042962

(51) Int. Cl.
*H04Q 11/00* (2006.01)
*H04J 3/06* (2006.01)
*H04J 3/16* (2006.01)

(52) U.S. Cl.
CPC ........ *H04Q 11/0005* (2013.01); *H04J 3/0623* (2013.01); *H04J 3/0658* (2013.01); *H04J 3/0691* (2013.01); *H04J 3/1652* (2013.01); *H04Q 2011/0045* (2013.01)

(58) Field of Classification Search
CPC ....... H04Q 11/0005; H04Q 2011/0045; H04Q 2011/002; H04Q 11/0066; H04J 3/0658; H04J 3/1652; H04J 3/0691; H04J 3/0623; H04J 14/08
See application file for complete search history.

(56) References Cited

U.S. PATENT DOCUMENTS

| | | | | |
|---|---|---|---|---|
| 5,710,649 A | * | 1/1998 | Mollenauer | H04B 10/25077 375/371 |
| 8,054,865 B1 | * | 11/2011 | Frost | H04L 9/0838 375/130 |
| 2006/0239687 A1 | * | 10/2006 | Gopinath | H04B 10/503 398/115 |

FOREIGN PATENT DOCUMENTS

JP 2007-150423 6/2007

* cited by examiner

*Primary Examiner* — Ted Wang
(74) *Attorney, Agent, or Firm* — Staas & Halsey LLP

(57) ABSTRACT

An optical transmission device includes: a receiver configured to receive a signal including data; a generator configured to generate an output clock to output the data based on a signal clock synchronized with the signal; and a controller configured to control a frequency of the output clock based on a first amount of the data so that the output clock follows a clock of a transmission source of the data.

8 Claims, 26 Drawing Sheets

FIG. 16

| CLIENT DATA AMOUNT (IN BYTE) | OUTPUT |
|---|---|
| EACH +5 | 0h8b + 1 |
| +15 | 0h8b |
| +10 | 0h8a |
| +5 | 0h89 |
| 15240 ± LESS THAN 5 | 0h88 |
| −5 | 0h87 |
| −10 | 0h86 |
| −15 | 0h85 |
| EACH −5 | 0h85 − 1 |

| ΔF CHANGE | OUTPUT 211 |
|---|---|
| EACH +1 | 0h8b + 1 |
| +3 | 0h8b |
| +2 | 0h8a |
| +1 | 0h89 |
| 0 | 0h88 |
| −1 | 0h87 |
| −2 | 0h86 |
| −3 | 0h85 |
| EACH −1 | 0h85 − 1 |

FIG. 18

| FIFO CAPACITY (IN BITS) | OUTPUT |
|---|---|
| EACH +100 | 0h8b + 1 |
| +300 | 0h8b |
| +200 | 0h8a |
| +100 | 0h89 |
| 2048 ± LESS THAN 100 | 0h88 |
| −100 | 0h87 |
| −200 | 0h86 |
| −300 | 0h85 |
| EACH −100 | 0h85 − 1 |

OPTICAL TRANSMISSION DEVICE AND OPTICAL TRANSMISSION CONTROL METHOD

CROSS-REFERENCE TO RELATED APPLICATION

This application is based upon and claims the benefit of priority of the prior Japanese Patent Application No. 2015-042962, filed on Mar. 4, 2015, the entire contents of which are incorporated herein by reference.

FIELD

The embodiments discussed herein are related to an optical transmission device and to an optical transmission control method.

BACKGROUND

Recently, a transmission device that supports an optical transport network (OTN) is provided as a transmission device transmitting information. Such a transmission device changes a client-side clock frequency to an OTN-side clock frequency because the client-side clock and the OTN-side clock have different frequencies and transmits client data that is a transmission target.

Upon receiving a client signal from a client that is a data transmission source, the transmission device stores the client data included in the received client signal in a first-in-first-out (FIFO). In addition, the transmission device reads the client data from the FIFO at the OTN-side clock frequency. Then, the transmission device maps the client data read from the FIFO and stuff data that reduces a phase difference between the OTN-side clock and the client-side clock onto the payload of an optical channel transport unit (OTU) frame.

The transmission device generates a Cm value and a Cnd value and stores the Cm value and the Cnd value in the header of the OTU frame. The Cm value indicates an amount of the client data mapped onto the payload, and the Cnd value is a value resulting from adding fluctuation in data for a certain period of time. Then, the transmission device transmits the OTU frame to a counterpart transmission device through the OTN.

The counterpart transmission device, meanwhile, extracts the client data from the received OTU frame and stores the extracted client data in the FIFO. In addition, the counterpart transmission device extracts the Cm value and the Cnd value from the received OTU frame and calculates a Cn value that is the difference value between the Cm value and the amount of logical data in the OTU frame, based on the extracted Cm value and the Cnd value. Then, the counterpart transmission device regenerates the OTN-side clock from the OTU frame and generates the clock that is used by the client being the transmission source of the client data, by using the regenerated OTN-side clock, the extracted Cm value, and the Cn value.

More specifically, the counterpart transmission device compares a frequency resulting from adding the proportion of the client data to the payload of the OTU frame to the frequency of the regenerated OTN-side clock with the frequency of the clock generated as the client-side clock. Then, the counterpart transmission device controls the frequency of the generated clock to reduce the frequency gap resulting from the comparison, reads the client data from the FIFO based on the generated clock, and transmits the read client data to the client that is a transmission destination.

Japanese Laid-open Patent Publication No. 2007-150423 is an example of the related art.

SUMMARY

According to an aspect of the invention, an optical transmission device includes: a receiver configured to receive a signal including data; a generator configured to generate an output clock to output the data based on a signal clock synchronized with the signal; and a controller configured to control a frequency of the output clock based on a first amount of the data so that the output clock follows a clock of a transmission source of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a table illustrating an example of output values for given client data amounts;

FIG. 17 is a table illustrating an example of output values for given $\Delta F$ values;

FIG. 18 is a table illustrating an example of output values for given FIFO capacities;

DESCRIPTION OF EMBODIMENTS

In the technique of the related art, the counterpart transmission device might not regenerate the clock of the client which is the data transmission source, thereby causing error.

For example, when the OTN-side clock is distorted in the transmission device which is the transmission source of the OTU frame, the OTN-side clock fluctuates with respect to the amount of logical data. Thus, the Cm value and the Cn value significantly fluctuate in a short period of time. Therefore, the counterpart transmission device might not cause the frequency of the generated clock to follow the clock of the client which is the data transmission source, thus causing an overflow or underflow of the FIFO.

Hereinafter, embodiments of an optical transmission device and an optical transmission control method capable of causing the frequency of a generated clock to follow the clock of a client that is a data transmission source will be described in detail with reference to the drawings. Configurations having the same function will be designated by the same reference sign in the embodiments, and duplicate descriptions thereof will be omitted. The embodiments described below are for illustrative purposes only. The embodiments of the optical transmission device and the optical transmission control method disclosed in the present specification are not for restrictive purposes. In addition, the embodiments described below may be appropriately combined to the extent not inconsistent with each other.

First Embodiment

Figure 1:
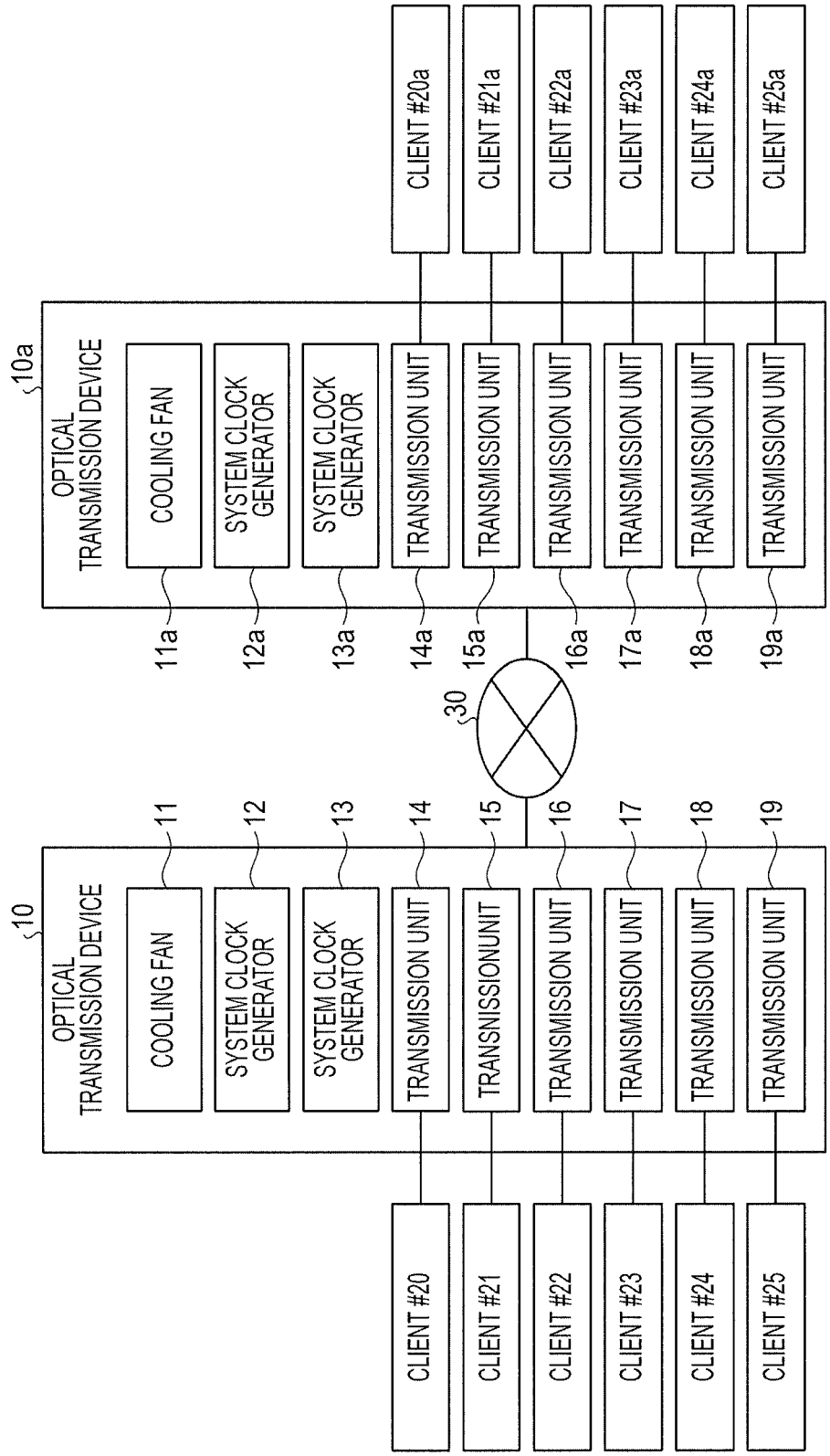
FIG. 1 is a block diagram illustrating an example of a transmission system according to a first embodiment.

FIG. 1 is a block diagram illustrating an example of a transmission system according to a first embodiment. As illustrated in FIG. 1, a transmission system 1 includes optical transmission devices 10 and 10a, clients #20 to #25 and #20a to #25a, and a network 30. The network 30 is, for example, an OTN. The clients #20 to #25 are coupled to the optical transmission device 10, and the clients #20a to #25a are coupled to the optical transmission device 10a. In the description below, the clients #20 to #25 coupled to the optical transmission device 10 may be collectively referred to as a client 20, and the clients #20a to #25a coupled to the optical transmission device 10a may be collectively referred to as a client 20a.

The optical transmission devices 10 and 10a are, for example, a transmission device that transmits and receives data through an OTN. Specifically, the optical transmission device 10 is coupled to the client 20 and transmits data that is to be transmitted to the client 20a by the client 20 to the optical transmission device 10a through the network 30. The optical transmission device 10a is coupled to the client 20a and transmits data received through the network 30 from the optical transmission device 10 to the client 20a.

The client 20 is a client that transmits and receives data with the client 20a. The client 20, for example, outputs data that is a transmission target (hereinafter, referred to as client data) to the optical transmission device 10 based on a client-side clock (hereinafter, referred to as a client clock). Then, the optical transmission device 10 transmits the client data to the optical transmission device 10a based on an OTN-side clock (hereinafter, referred to as a system clock). The client #20, for example, is input into a transmission unit 14 through an optical fiber. The clients #20 to #25 and #20a to #25a may be in the same building or city, or each thereof may be in a different building or city.

The optical transmission device 10a, meanwhile, regenerates the client clock used by the client 20 from the received client data. Then, the optical transmission device 10a outputs the received client data to the client 20a based on the regenerated client clock. Each of the clients 20 and 20a uses the same clock source as the clients #20 to #25 and may operate at the same client clock or may operate at a different frequency.

Hereinafter, a configuration of the optical transmission devices 10 and 10a will be described. The optical transmission device 10 includes a cooling fan 11, a plurality of system clock generators 12 and 13, and a plurality of transmission units 14 to 19. The optical transmission device 10a includes a cooling fan 11a, a plurality of system clock generators 12a and 13a, and a plurality of transmission units 14a to 19a.

The cooling fan 11a and the plurality of system clock generators 12a and 13a of the optical transmission device 10a exhibit the same function as the cooling fan 11 and the plurality of system clock generators 12 and 13 of the optical transmission device 10, thus not being described herein. In addition, the transmission units 15 to 19 and 14a to 19a exhibit the same function as the transmission unit 14. Therefore, the transmission units 15 to 19 and 15a to 19a will not be described hereinafter.

The cooling fan 11 is, for example, a fan that cools a variety of hardware included in the optical transmission device 10. The system clock generators 12 and 13 are, for example, a clock supplying device that supplies the system clock to each of the transmission units 14 to 19 and are redundantly configured.

The transmission unit 14 is, for example, a transmission device that transmits and receives data with the transmission units 14a to 19a of the optical transmission device 10a through the network 30. The transmission unit 14, when receiving the client signal storing the client data from the client 20, separates the client signal into the client clock and the client data. Then, the transmission unit 14 stores the client data in the OTU frame. For example, the transmission unit 14 stores the client data, having a smaller amount of data than the payload of the OTU frame, in the OTU frame and stores predetermined stuff data in the remaining area of the OTU frame.

The transmission unit 14 generates difference information that indicates the difference between the client clock and the system clock as information used by a transmission unit that is the transmission destination of the OTU frame (for example, the transmission unit 14a) to regenerate the clock used by the client 20. For example, the transmission unit 14 generates the Cm value, which indicates the amount of client data mapped onto the payload, and the Cnd value, which is the value resulting from adding fluctuation in valid data for a certain period of time, and stores the Cm value and the Cnd value in the header of the OTU frame. Then, the transmission unit 14 transmits a data signal that includes the OTU frame to the transmission unit 14a based on the system clock.

The transmission unit 14a regenerates the system clock of the transmission unit 14 from the received data signal and obtains the OTU frame. Then, the transmission unit 14a extracts the client data, the Cm value, and the Cnd value from the OTU frame and stores the client data in the FIFO based on the regenerated system clock. In addition, the transmission unit 14a regenerates the client clock used by the client 20 by using the regenerated system clock and the extracted Cm value and the Cnd value. Then, the transmission unit 14a reads the client data from the FIFO based on the regenerated client clock (hereinafter, referred to as an output clock) and outputs the read data to the client 20a.

The transmission unit 14a uses a digital phase-locked loop (DPLL) to generate the output clock based on the regenerated system clock and the extracted Cm value and the Cnd value. Specifically, the transmission unit 14a calculates the Cn value, which is the difference between the amount of logical data in the OTU frame and the Cm value, based on the extracted Cm value and the Cnd value and obtains the proportion of the client data stored in the payload from the Cm value and the Cn value. In addition, the transmission unit 14a adds the obtained proportion of the client data to the frequency of the regenerated system clock and calculates the difference between the added frequency and the frequency of the feedback output clock. Then, the transmission unit 14a performs feedback control that changes the frequency of the output clock such that the calculated difference becomes "zero".

However, the system clock of the transmission unit 14 is distorted in a case where the supply source of the system clock is switched from the system clock generator 12 to the system clock generator 13 because of failure occurring in the system clock generator 12. In such a case, the system clock of the transmission unit 14 significantly fluctuates in a short period of time with respect to the amount of logical data, and the Cm value or the Cn value also fluctuates significantly in a short period of time. As a consequence, the transmission unit 14a might not cause the output clock to follow the client clock of the client 20, thereby causing an overflow or underflow of the FIFO.

The transmission unit 14a, therefore, performs the following process. First, the transmission unit 14a generates the output clock based on the system clock regenerated from the OTU frame and on the Cm value and the Cn value extracted from the OTU frame. Then, the transmission unit 14a controls the frequency of the output clock based on the amount of the client data stored in the OTU frame such that the output clock follows the client clock of the client 20.

The transmission unit 14a, for example, increases the frequency of the output clock in a case where the amount of the client data specified is increased from the previous amount thereof or decreases the frequency of the output clock in a case where the amount of the client data specified is decreased from the previous amount thereof. Then, the transmission unit 14a transmits the received client data to the client 20a based on the generated output clock.

The transmission unit 14a, as described above, controls the frequency of the output clock based on the amount of the client data received. As a consequence, the transmission unit 14a may cause the output clock to instantaneously follow the client clock of the client 20 even in a case where feedback control of the DPLL might not follow the clock distortion in the transmission unit 14. Thus, the transmission unit 14a, for example, may reduce overflows or underflows of the FIFO.

The Cm value and the Cn value are not dependent on the client clock. Thus, the transmission unit 14a may instantaneously control the frequency of the output clock in comparison with a case where the frequency of the output clock is controlled by using other information such as the amount of data stored in the FIFO.

The transmission units 14 to 19 and 15a to 19a, in the above description, control the frequency of the output clock in the same manner as the transmission unit 14a based on the amount of the client data. Hereinafter, the transmission unit 14 that controls the frequency of the output clock in the same manner as the transmission unit 14a based on the amount of the client data when receiving the OTU frame will be described in detail.

Figure 2:
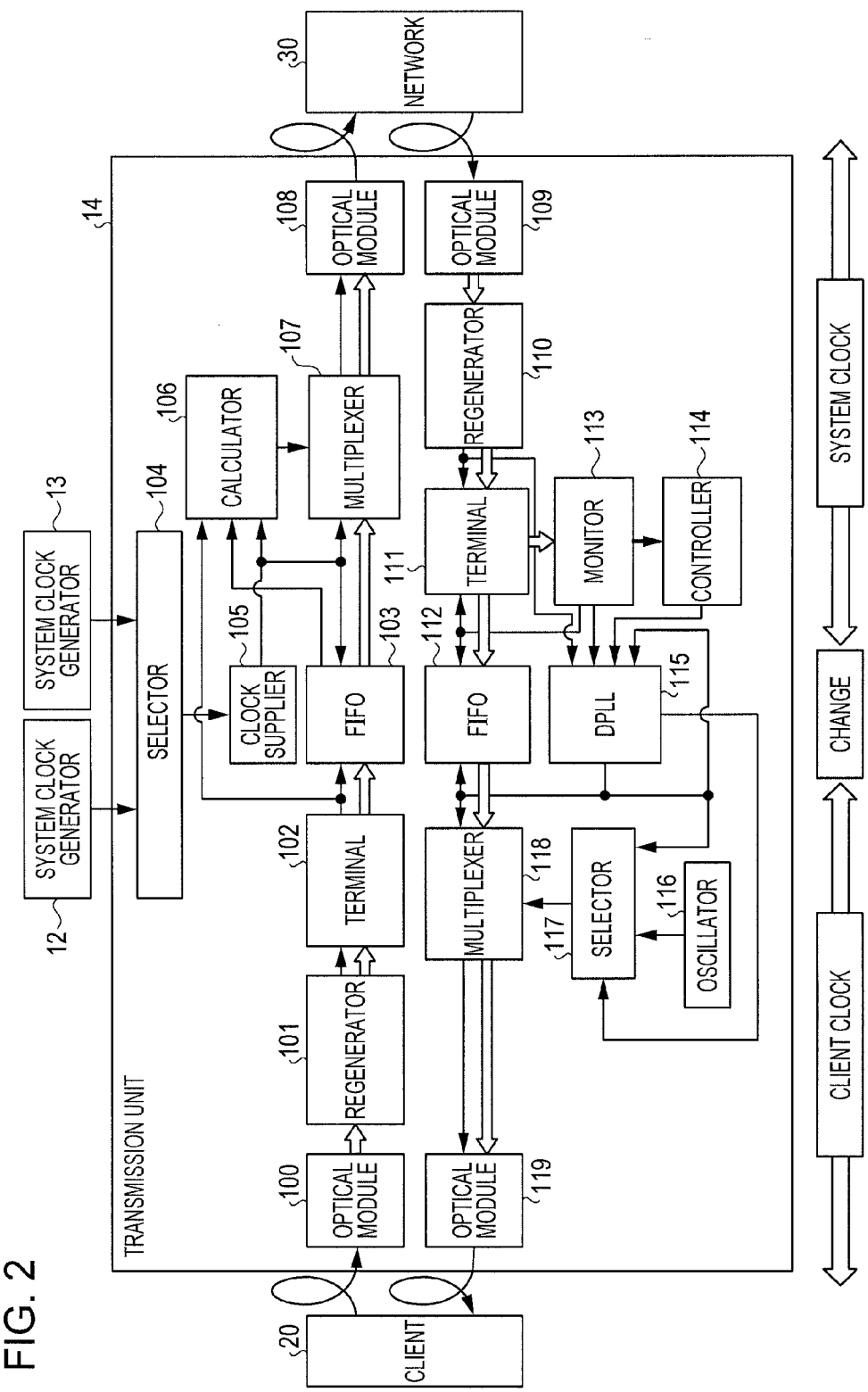
FIG. 2 is a block diagram illustrating an example of a configuration of a transmission unit.

FIG. 2 is a block diagram illustrating an example of a configuration of the transmission unit. In the example illustrated in FIG. 2, thin arrows illustrate the client clock and the system clock, and thick arrows illustrate the client data.

The transmission unit 14, for example, includes optical modules 100, 108, 109, and 119, regenerators 101 and 110, terminals 102 and 111, FIFOs 103 and 112, a selector 104, a clock supplier 105, a calculator 106, and multiplexers 107 and 118. In addition, the transmission unit 14, for example, includes a monitor 113, a controller 114, a DPLL 115, an oscillator 116, and a selector 117.

The optical module 100, the regenerator 101, the terminal 102, the FIFO 103, the selector 104, the clock supplier 105, the calculator 106, the multiplexer 107, and the optical module 108 are a functional configuration that is used in the transmission of the OTU frame. The optical module 100, the regenerator 101, and the terminal 102 operate based on the client clock used by the client 20. The calculator 106, the multiplexer 107, and the optical module 108 operate based on the system clock generated by the system clock generators 12 and 13.

The optical module 109, the regenerator 110, the terminal 111, the FIFO 112, the monitor 113, the controller 114, the DPLL 115, the oscillator 116, the selector 117, the multiplexer 118, and the optical module 119 are a functional configuration that is used in the reception of the OTU frame. The optical module 109, the regenerator 110, the terminal 111, the monitor 113, and the controller 114 operate based on the system clock of the transmission unit 14a that is regenerated from the OTU frame. The selector 117, the multiplexer 118, and the optical module 119 operate based on the output clock generated by the DPLL 115, that is, based on the regenerated client clock of the client 20a.

Hereinafter, the functional configuration used in the transmission of the OTU frame will be first described, and then, the functional configuration used in the reception of the OTU frame will be described. The optical module 100 receives the client signal from the client 20 based on the client clock. Then, the optical module 100 outputs the client signal to the regenerator 101.

The regenerator 101 regenerates the client clock from the client signal and separates the client signal into the client clock and the client data. Then, the regenerator 101 outputs the client clock and the client data to the terminal 102.

The terminal 102 performs termination of the client data. Then, the terminal 102 stores the terminated client data in the FIFO 103 based on the client clock. In addition, terminal 102 outputs the client clock to the calculator 106.

The FIFO 103 is a storage that temporarily stores the client data. The FIFO 103, for example, stores the client data based on the client clock supplied from the terminal 102. Then, the FIFO 103, as described later, outputs the stored client data to the multiplexer 107 based on the system clock supplied from the clock supplier 105.

The selector 104 selects a system clock to be used by the transmission unit 14 from the system clocks generated by the system clock generators 12 and 13. The selector 104, for example, outputs the system clock generated by the system clock generator 12 to the clock supplier 105. Then, the selector 104 switches the clock to be output to the clock supplier 105 to the system clock generated by the system clock generator 13 in a case where failure occurs in the system clock generator 12.

The clock supplier 105 supplies the system clock distributively. The clock supplier 105, for example, outputs the system clock received from the selector 104 to all of the FIFO 103, the calculator 106, and the multiplexer 107. The clock supplier 105, in a case where the system clock generators 12 and 13 supply a frequency-divided system clock, multiples the system clock and outputs the system clock to all of the FIFO 103, the calculator 106, and the multiplexer 107.

The calculator 106 calculates the Cm value and the Cn value. The calculator 106, for example, generates the Cn value based on the system clock, the client clock, and the amount of data stored in the FIFO 103 and calculates the Cm value and the Cnd value from the calculated Cn value.

The multiplexer 107 reads the client data, which is a transmission target, from the FIFO 103 based on the input system clock and stores the read client data and the stuff data in the payload area of the OTU frame. Then, the multiplexer 107 inserts the Cm value and the Cnd value calculated by the calculator 106 into the header of the OTU frame and outputs the OTU frame to the optical module 108.

The optical module 108, when receiving an OTU frame data signal from the multiplexer 107, converts the OTU frame data signal into a light signal and transmits the light signal to the counterpart transmission unit through the network 30.

Figure 3:
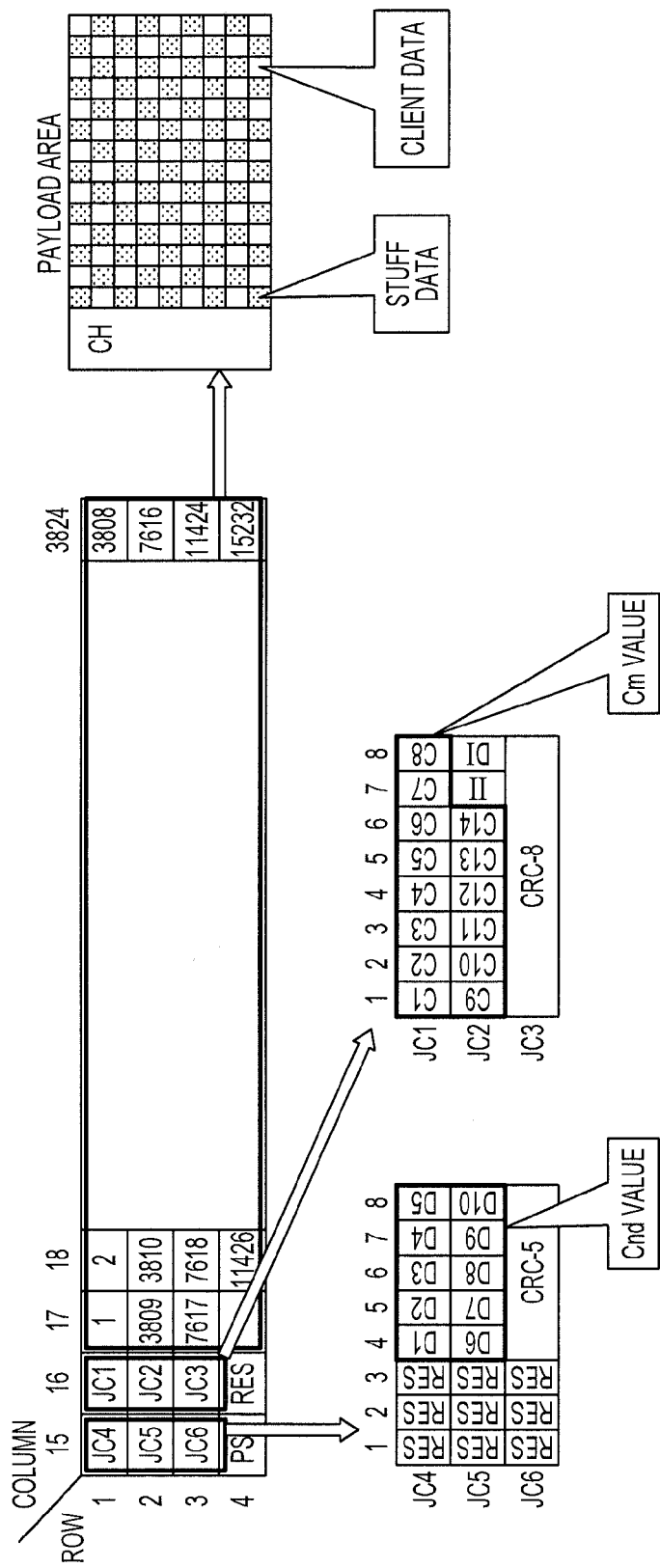
FIG. 3 is a diagram illustrating an example of an OTU frame.

FIG. 3 is a diagram illustrating an example of the OTU frame. The 15-th to the 3824-th bytes of the OTU frame in the direction of columns and the first to the fourth bits thereof in the direction of rows are illustrated in the example illustrated in FIG. 3. The 15-th and the 16-th bytes of the OTU frame in the direction of columns are configured as a header area. JC bytes JC1 to JC6 that include the Cm value and the Cnd value are set in the header area.

The multiplexer 107, for example, stores the Cnd value in the 10-bit area of D1 to D10 that is set from the fourth to the eighth bits of the JC4 and JC5. In addition, the multiplexer 107, for example, stores the Cm value in the 14-bit area of C1 to C14 that is set from the first to the eighth bits of JC1 and from the first to the sixth bits of JC2.

The 17-th to the 3824-th bytes of the OTU frame are configured as a payload area. The multiplexer 107, for example, stores the client data and the stuff data (for example, the value "zero") in the payload area so as to reduce the frequency difference between the client clock and the system clock. Then, the multiplexer 107 outputs the OTU frame data signal to the optical module 108.

Returning to FIG. 2, the functional configuration used in the reception of the OTU frame will be described. The description below assumes a case where the transmission unit 14 receives the OTU frame storing the client data that is transmitted by the client 20a to the client 20.

The optical module 109 receives the OTU frame light signal through the network 30. Then, the optical module 109 converts the received light signal into the OTU frame data signal and outputs the data signal to the regenerator 110.

The regenerator 110 separates the system clock from the OTU frame data signal and outputs the OTU frame data signal and the system clock to the terminal 111. Then, the regenerator 110 outputs the system clock to the DPLL 115.

The terminal 111 performs termination of the OTU frame data signal that is input from the regenerator 110 and converts the data signal into the OTU frame. In addition, the terminal 111 extracts the data stored in the payload of the OTU frame and stores the extracted data in the FIFO 112 based on a burst clock described later. Then, the terminal 111 extracts the JC bytes from the header of the OTU frame and outputs the extracted JC bytes to the monitor 113.

The monitor 113 obtains the Cm value and the Cnd value from the input JC bytes and calculates the Cn value from the Cm value and the Cnd value. In addition, the monitor 113 calculates the amount of the client data stored in the OTU frame (hereinafter, referred to as a client data amount) from the Cm value and the Cn value. Then, the monitor 113 outputs the calculated client data amount to the controller 114.

The monitor 113 generates the burst clock that indicates the output timing of the client data based on the Cm value, the Cn value, and the stuff data in a case where the terminal 111 sequentially outputs the data stored in the payload of the OTU frame. Then, the monitor 113 outputs the generated burst clock to the terminal 111 and to the FIFO 112. The monitor 113 outputs a data enable signal to the DPLL 115. The data enable signal indicates the timing of outputting the client data to the terminal 111.

The controller 114 controls the DPLL 115 based on the client data amount and controls the frequency of the output clock such that the output clock follows the client clock of the client 20a. The controller 114, for example, controls the DPLL 115 to increase the frequency of the output clock in a case where a change in the client data amount received from the monitor 113 is greater than a predetermined threshold. Meanwhile, the controller 114 controls the DPLL 115 to decrease the frequency of the output clock in a case where a change in the client data amount received from the monitor 113 is less than a predetermined threshold.

The DPLL 115 generates the output clock based on the regenerated system clock, the Cm value, and the Cn value. Specifically, the DPLL 115 changes the frequency of the generated output clock based on the system clock separated by the regenerator 110 and on the data enable signal input from the monitor 113. In addition, the DPLL 115 controls the frequency of the generated output clock following the control of the controller 114 and causes the frequency of the output clock to follow the client clock used by the client 20a. Specific processing performed by the DPLL 115 will be described later.

The oscillator 116 is an oscillator that oscillates a clock having a predetermined frequency. The selector 117 outputs the output clock generated by the DPLL 115 or the clock caused to oscillate by the oscillator 116 to the multiplexer 118 based on the control of a status monitor 156 described later.

The multiplexer 118, in a case where the selector 117 selects the output clock generated by the DPLL 115, reads the client data from the FIFO 112 based on the selected output clock. Then, the multiplexer 118 outputs the read client data and the output clock to the optical module 119. The optical module 119 outputs the client data to the client 20 based on the output clock.

The multiplexer 118, meanwhile, in a case where the selector 117 selects the clock caused to oscillate by the oscillator 116, generates an error signal that indicates occurrence of error based on the selected clock and outputs the generated error signal to the optical module 119. The optical module 119 outputs the error signal to the client 20.

Figure 4:
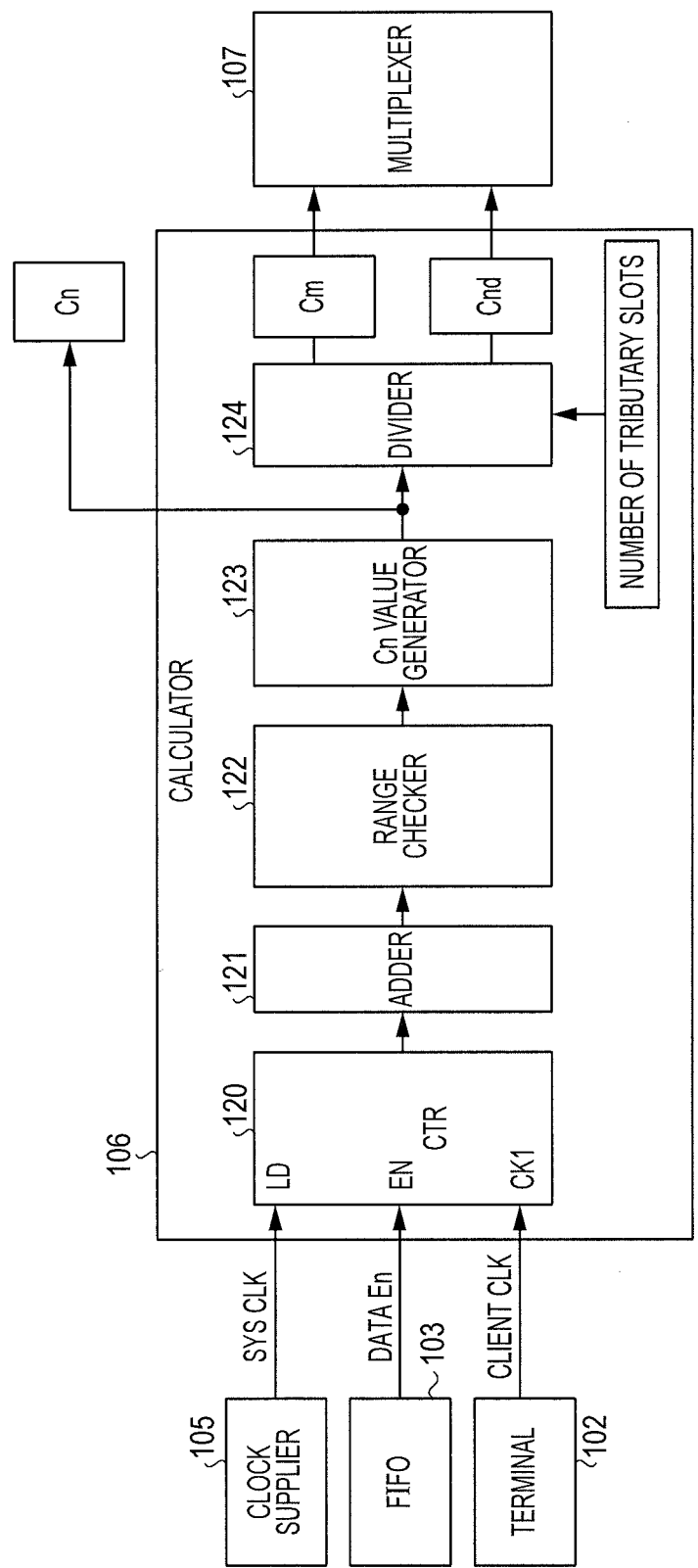
FIG. 4 is a block diagram illustrating an example of a functional configuration of a calculator.

Next, an example of the calculator 106 will be described. FIG. 4 is a block diagram illustrating an example of a functional configuration of the calculator 106. The calculator 106 includes a counter (CTR) 120, an adder 121, a range checker 122, a Cn value generator 123, and a divider 124 in the example illustrated in FIG. 4.

The CTR 120 is a counter that includes a load terminal (LD), an enable terminal (EN), and a clock terminal (CK1) and that counts the number of pulses input into CK1 when the enable terminal is in a High state. In addition, the CTR 120 resets the counted value when the load terminal is in a Low state.

A frame pulse (FP) into which the system clock (SYS CLK) is frequency-divided by a certain cycle (for example, a cycle of 8 kHz) is input into the load terminal of the CTR 120 from the clock supplier 105. The data enable signal (DATA En) that goes into the High state when the client data is output from the FIFO 103 is input into the enable terminal of the CTR 120. The client clock (Client CLK) is input into the clock terminal of the CTR 120 from the terminal 102. The CTR 120 counts the number of pulses of the client clock while the data enable signal is in the High state and outputs the count to the adder 121.

The adder 121 adds the number of pulses of the client clock output by the CTR 120 at all times during a predetermined time interval and outputs the resulting added value to the range checker 122 when the predetermined time interval elapses.

The range checker 122 determines whether the value received from the adder 121 falls within a predetermined range. Then, the range checker 122 outputs the received value to the Cn value generator 123 in a case where the value received from the adder 121 falls within the predetermined range. Meanwhile, the range checker 122 outputs a previously output value again to the Cn value generator 123 in a case where the value received from the adder 121 does not fall within the predetermined range.

The Cn value generator 123 calculates the Cn value from the value received from the range checker 122. Then, the Cn value generator 123 outputs the calculated Cn value to the divider 124.

The divider 124 divides the Cn value, which is generated by the Cn value generator 123, by the number of tributary slots that is the number of virtual slots into which the payload data area of the OTU frame is divided and calculates the Cm value as the quotient and the Cnd value as the remainder. Then, the divider 124 outputs the calculated Cm value and the Cnd value to the multiplexer 107.

Figure 5:
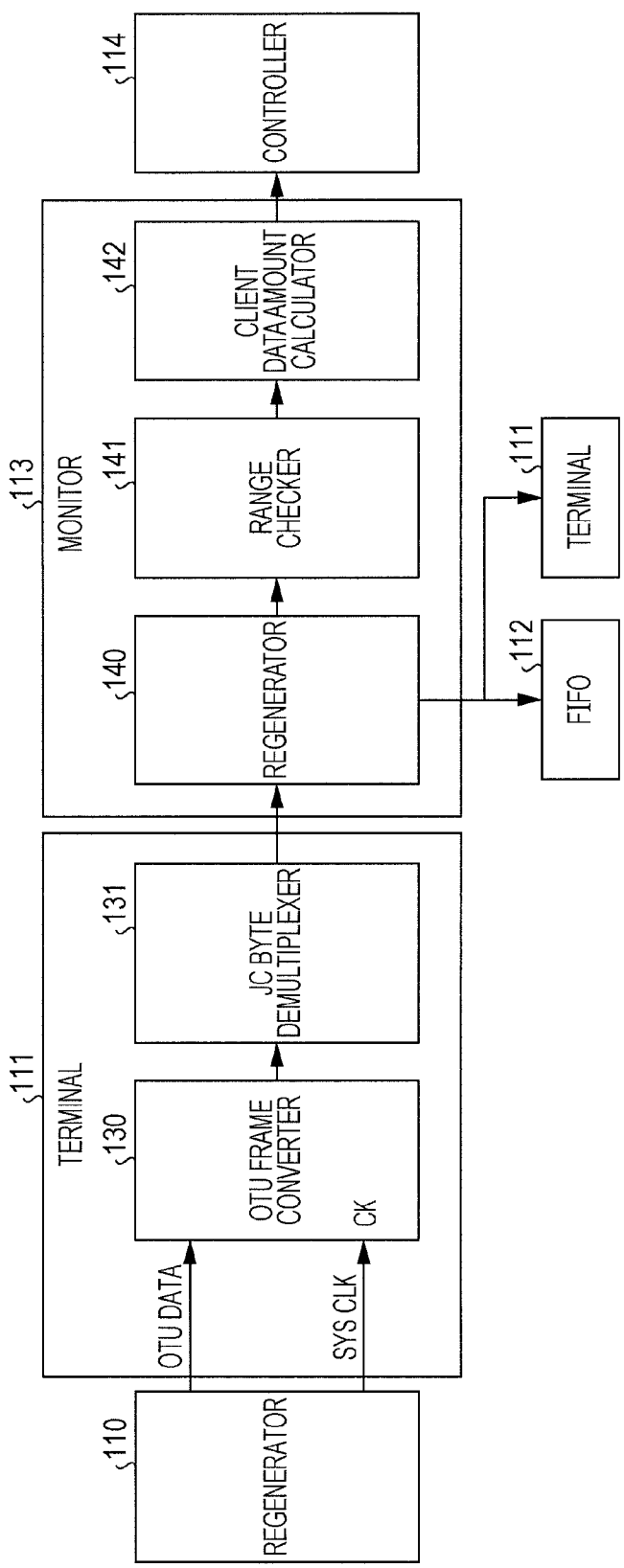
FIG. 5 is a block diagram illustrating an example of a functional configuration of a terminal and a monitor.

Next, an example of the terminal 111 and the monitor 113 will be described. FIG. 5 is a block diagram illustrating an example of a functional configuration of the terminal 111 and the monitor 113. The terminal 111, for example, includes an OTU frame converter 130 and a JC byte demultiplexer 131. The monitor 113 includes a regenerator 140, a range checker 141, and a client data amount calculator 142.

The OTU frame converter 130 receives the OTU frame data signal (OTU DATA) and the system clock from the regenerator 110. The OTU frame converter 130 converts the OTU frame data signal into the OTU frame and outputs the OTU frame to the JC byte demultiplexer 131 based on the system clock. The JC byte demultiplexer 131 extracts the JC bytes from the OTU frame. Then, the JC byte demultiplexer 131 outputs the extracted JC bytes to the monitor 113.

The regenerator 140, when receiving the JC bytes, regenerates the Cm value and the Cnd value from the received JC bytes and outputs the regenerated Cm value and the Cnd value to the range checker 141. In addition, the regenerator 140 generates the burst clock by using the stuff data and the regenerated Cm value and the Cnd value and outputs the generated burst clock to the terminal 111 and to the FIFO 112.

The range checker 141 determines whether the received Cm value and the Cnd value fall within a predetermined range and outputs the Cm value and the Cnd value to the client data amount calculator 142 in a case where the Cm value and the Cnd value fall within the predetermined range. Meanwhile, the range checker 141 outputs a previously output value to the client data amount calculator 142 in a case where the received Cm value and the Cnd value do not fall within the predetermined range.

The client data amount calculator 142 calculates the client data amount based on the received Cm value and the Cnd value and outputs the calculated client data amount to the controller 114.

Figure 6:
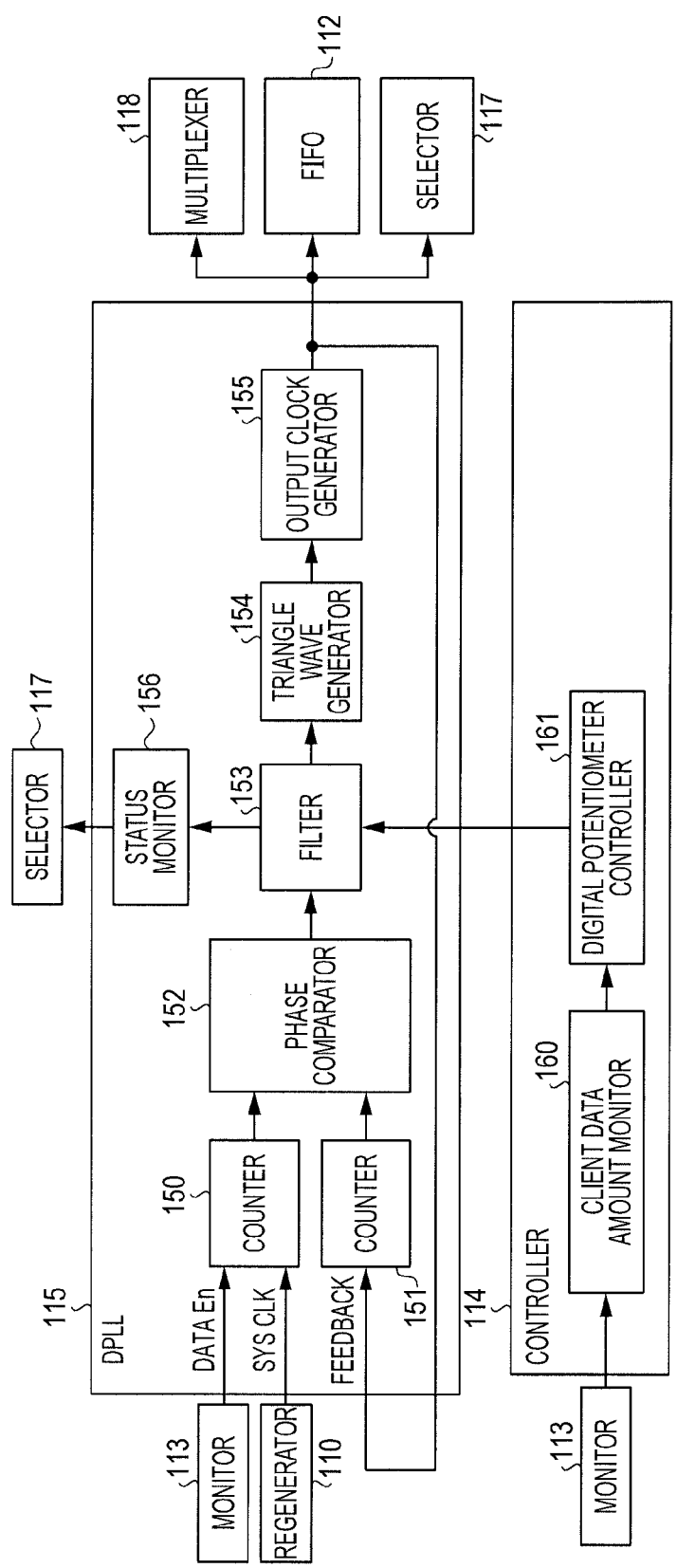
FIG. 6 is a block diagram illustrating an example of a functional configuration of a DPLL and a controller.

Next, an example of the DPLL 115 and the controller 114 will be described. FIG. 6 is a block diagram illustrating an example of a functional configuration of the DPLL 115 and the controller 114. The DPLL 115, for example, includes counters 150 and 151, a phase comparator 152, a filter 153, a triangle wave generator 154, an output clock generator 155, and a status monitor 156 in the example illustrated in FIG. 6.

The counter 150 counts the number of pulses of the system clock (SYS CLK) separated by the regenerator 110 when the data enable signal (DATA En) output by the monitor 113 is in the High state. That is, the counter 150 calculates a frequency that results from adding the proportion of the client data in the data stored in the payload to the frequency of the system clock.

The output clock generated by the DPLL 115 is input as feedback into the counter 151, and the counter 151 counts the number of pulses of the output clock. That is, the counter 151 calculates the frequency of the output clock.

The phase comparator 152 calculates the difference between values counted by the counters 150 and 151 as a phase difference and outputs a signal indicating the calculated phase difference to the filter 153. The filter 153 smooths the input signal based on predetermined frequency characteristics and response characteristics and outputs the smoothed signal to the triangle wave generator 154 that generates a triangle wave based on the input signal.

The triangle wave generator 154 generates a triangle wave based on the signal indicating the phase difference that is smoothed by the filter 153 and outputs the generated triangle wave to the output clock generator 155. The output clock generator 155 generates the output clock by using the triangle wave generated by the triangle wave generator 154 and outputs the generated output clock to all of the FIFO 112, the selector 117, the multiplexer 118, and the counter 151.

That is, the filter 153 changes the frequency of the output clock generated by the output clock generator 155 by smoothing the signal indicating the phase difference based on predetermined frequency characteristics and response characteristics with respect to the signal indicating the phase difference. The frequency characteristics and response characteristics of the filter 153, for example, may be changed by controlling an electronic variable resistor.

The phase comparator 152, the filter 153, the triangle wave generator 154, and the output clock generator 155 operate to reduce the phase difference calculated by the phase comparator 152. For example, the phase comparator 152 outputs a signal having a positive voltage in a case where the number counted by the counter 150 is greater than the number counted by the counter 151 or outputs a signal having a negative voltage in a case where the number counted by the counter 150 is less than the number counted by the counter 151. The triangle wave generator 154 increases the frequency of the generated triangle wave when a positive voltage is applied or decreases the frequency of the generated triangle wave when a negative voltage is applied.

The status monitor 156 obtains the calculated phase difference through the filter 153. Then, the status monitor 156 outputs a signal indicating selection of the output clock regenerated by the DPLL 115 to the selector 117 in a case where the obtained phase difference falls within a predetermined range. Meanwhile, the status monitor 156 outputs a signal indicating selection of the clock generated by the oscillator 116 to the selector 117 in a case where the obtained phase difference does not fall within the predetermined range.

The state where the phase difference falls within the predetermined range, that is, the state where the clock regenerated by the DPLL 115 is selected will be referred to as a lock state in the description below. In addition, the state where the phase difference does not fall within the predetermined range, that is, the state where the clock generated by the oscillator 116 is selected will be referred to as an unlock state.

The controller 114 includes a client data amount monitor 160 and a digital potentiometer controller 161. The client data amount monitor 160 obtains the client data amount calculated by the monitor 113. The digital potentiometer controller 161 controls at least one of the frequency bandwidth and the response characteristics of the filter 153 based on the client data amount.

The digital potentiometer controller 161, for example, controls the electronic variable resistor of the filter 153 such that the signal output by the filter 153 has a positive voltage in a case where an increase in the client data amount exceeds a predetermined threshold. Meanwhile, the digital potentiometer controller 161 controls the electronic variable resistor of the filter 153 such that the signal output by the filter 153 has a negative voltage in a case where an increase in the client data amount is less than or equal to the predetermined threshold.

Figure 7:
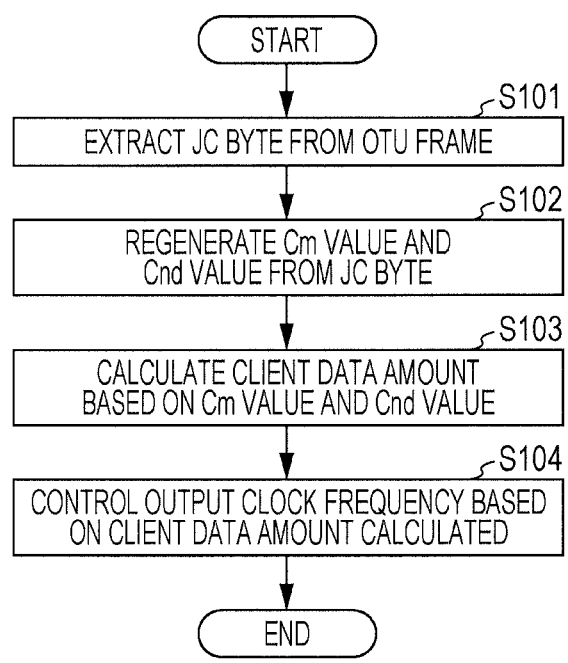
FIG. 7 is a flowchart illustrating an example of operation of the transmission unit.

Next, the flow of a process performed by the transmission unit 14 will be described by using FIG. 7. FIG. 7 is a flowchart illustrating an example of operation of the transmission unit. The transmission unit 14, for example, extracts the JC bytes from the OTU frame received from the transmission unit 14a (operation S101).

Next, the transmission unit 14 regenerates the Cm value and the Cnd value from the extracted JC bytes (operation S102). In addition, the transmission unit 14 calculates the client data amount based on the regenerated Cm value and the Cnd value (operation S103). Then, the transmission unit 14 controls the frequency of the output clock based on the calculated client data amount (operation S104) and ends the process.

The transmission unit 14 that performs the process illustrated in FIG. 7 controls the frequency of the output clock generated by the DPLL 115 based on the client data amount such that the output clock follows the client clock of the client 20a. Thus, the transmission unit 14, for example, may cause the frequency of the output clock to instantaneously follow the client clock of the client 20a even in a case where clock distortion occurs in the transmission unit 14a.

The transmission unit 14, as described above, receives the OTU frame including the client data and generates the output clock to output the client data based on the system clock regenerated from the received OTU frame. Then, the transmission unit 14 controls the frequency of the output clock based on the amount of the client data in the OTU frame such that the output clock follows the client clock of the client 20a.

The Cm value and the Cn value received by the transmission unit 14 are not dependent on the clock of the client 20 which is the transmission destination of the client data. Fluctuation of the system clock of the transmission unit 14a is directly and instantaneously reflected on the Cm value and on the Cn value. As a consequence, the transmission unit 14, for example, may cause the output clock to instantaneously follow the client clock of the client 20a even if the system clock is distorted in the transmission unit 14a which is the transmission source of the OTU frame.

Figure 8:
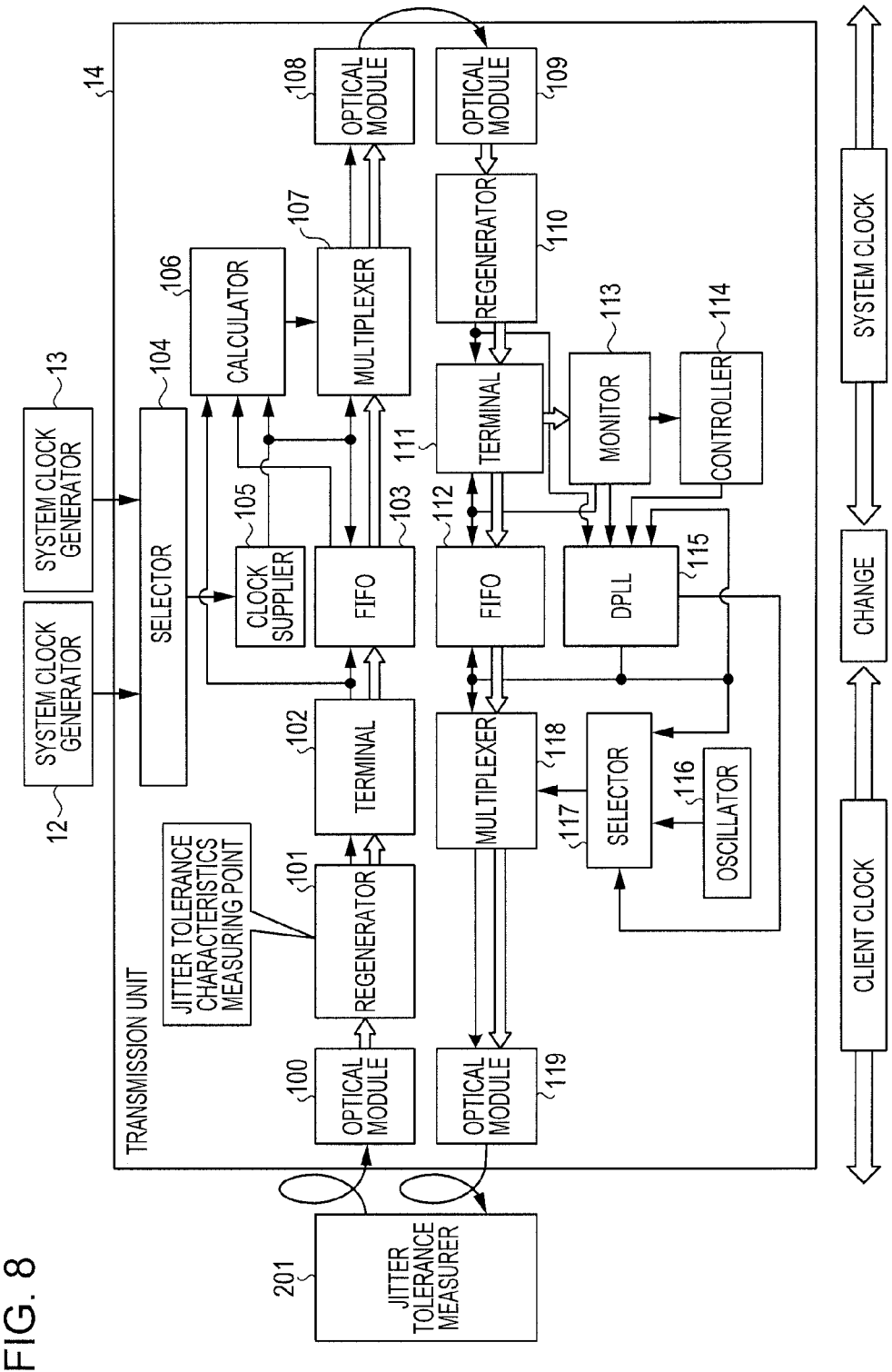
FIG. 8 is a block diagram illustrating an example of jitter tolerance measurement performed by the transmission unit.

The transmission unit 14 may reduce errors occurring in jitter tolerance measurement that measures the jitter tolerance of the regenerator 101. FIG. 8, for example, is a block diagram illustrating an example of the jitter tolerance measurement performed by the transmission unit. In a case of performing the jitter tolerance measurement, a jitter tolerance measurer 201 that measures the jitter tolerance of the regenerator 101 is coupled to the transmission unit 14 instead of the client 20. In addition, the optical module 108 is coupled to the optical module 109 and transmits the OTU frame light signal to the optical module 109. In that case, the transmission unit 14 causes the frequency of the output clock generated by the DPLL 115 to follow the clock of the jitter tolerance measurer 201.

An overflow or underflow may occur in the FIFO 112 during the jitter tolerance measurement in a case where the followability of the output clock generated by the DPLL 115 is low. In addition, when the Cm value or the Cnd value significantly fluctuates in a short period of time, the phase difference increases in a short period of time, thereby bringing about the unlock state, in which case the signal indicating occurrence of error is output and the data stored in the FIFO 112 might not be output.

The transmission unit 14, however, may cause the output clock generated by the DPLL 115 to follow the clock of the jitter tolerance measurer 201 that is a transmission source of data. As a consequence, the transmission unit 14 may reduce occurrence of error and measure the jitter tolerance of the regenerator 101 appropriately.

The transmission unit 14 calculates the difference between the frequency of the system clock, resulting from adding the proportion of the client data amount in the payload, and the frequency of the generated output clock as the phase difference. In addition, the transmission unit 14 changes the frequency of the generated output clock based on the predetermined characteristics with respect to the calculated phase difference. In addition, the transmission unit 14 controls the predetermined characteristics with respect to the phase difference based on the client data amount. As a consequence, the transmission unit 14 may cause the output clock to instantaneously follow the client clock of the client 20a.

The phase difference in the phase comparator 152 increases if the Cm value or the Cn value significantly fluctuates in a short period of time because of clock distortion, in which case the unlock state may occur. In that case, AISL or the like may be output instead of the client data stored in the FIFO 112, and an overflow may occur in the FIFO 112. Therefore, the transmission unit 14 may change the scope of determining occurrence of the lock state and the unlock state based on the client data amount or the like. Such an embodiment will be described as a second embodiment hereinafter.

Second Embodiment

Figure 9:
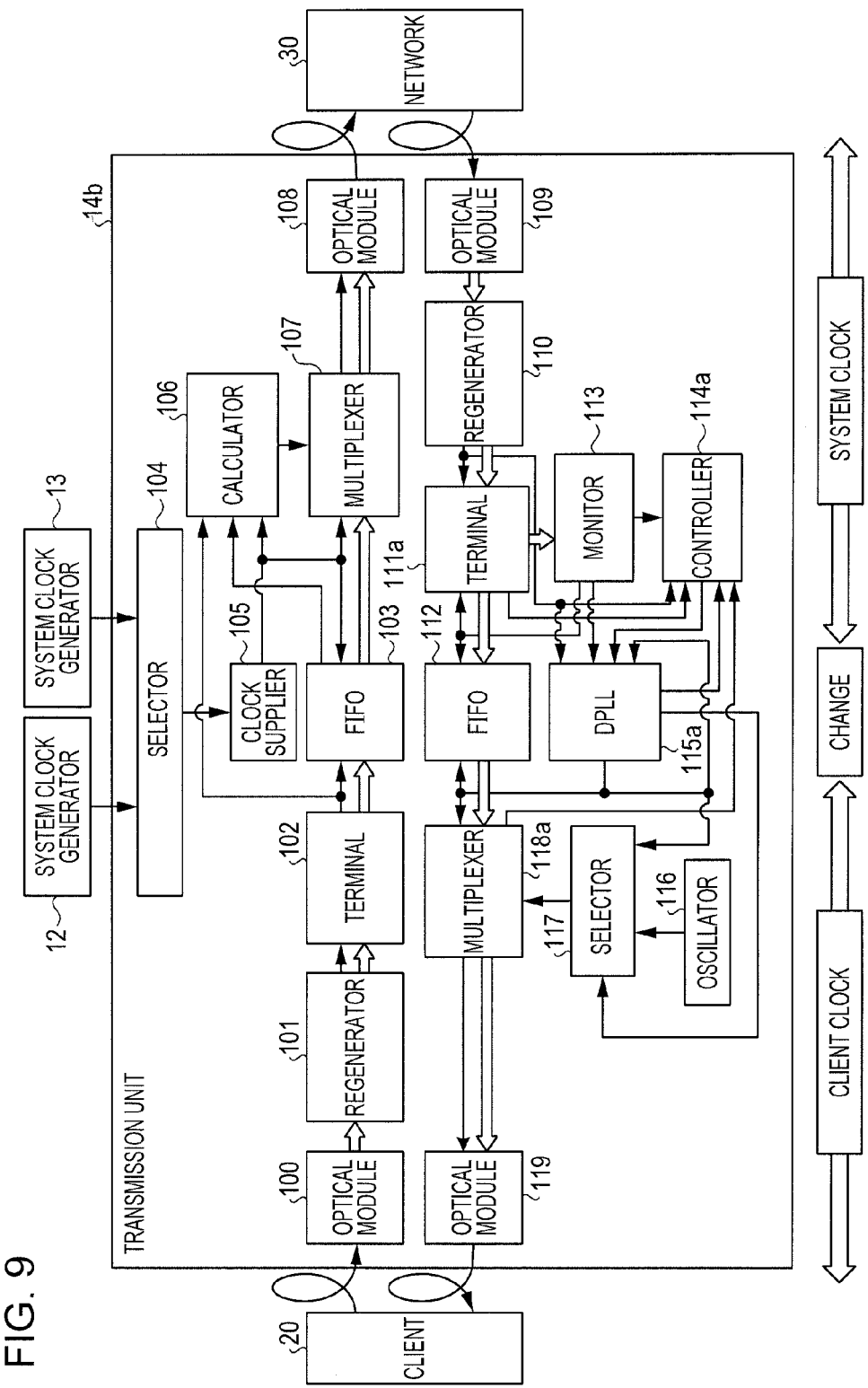
FIG. 9 is a block diagram illustrating an example of a functional configuration of a transmission unit according to a second embodiment.

FIG. 9 is a block diagram illustrating an example of a functional configuration of a transmission unit according to the second embodiment. The same constituent as in the transmission unit 14 of the first embodiment will be designated by the same reference sign, and duplicate descriptions will not be provided of the configuration and operation thereof. A transmission unit 14b illustrated in FIG. 9 includes a terminal 111a, a controller 114a, a DPLL 115a, and a multiplexer 118a instead of the terminal 111, the controller 114, the DPLL 115, and the multiplexer 118 of the transmission unit 14 illustrated in FIG. 1. Hereinafter, processing will be described in order of the terminal 111a, the multiplexer 118a, the controller 114a, and the DPLL 115a.

The terminal 111a has the same function as the terminal 111. In addition, the terminal 111a outputs a signal indicating writing of the client data into the FIFO 112 to the controller 114a as a write data enable signal (WRITE DATA EN).

The multiplexer 118a has the same function as the multiplexer 118. In addition, the multiplexer 118a outputs a signal indicating reading of the client data from the FIFO 112 to the controller 114a as a read data enable signal (READ DATA EN).

The controller 114a, in the same manner as the controller 114, calculates the client data amount and controls the frequency of the output clock generated by the DPLL 115a based on the calculated client data amount. In addition, the controller 114a performs the following process.

First, the controller 114a obtains the phase difference calculated from the DPLL 115a, that is, frequency deviation information ($\Delta F$) that indicates a frequency deviation. In addition, the controller 114a obtains the system clock separated by the regenerator 110, the output clock generated by the DPLL 115a, and WRITE DATA EN and READ DATA EN output by the multiplexer 118a. Then, the controller 114a obtains the amount of the client data stored in the FIFO 112 as a FIFO capacity by using each signal obtained.

The controller 114a changes a threshold that is used in determining occurrence of the lock state and the unlock state performed by the status monitor 156 based on the client data amount, $\Delta F$, and the FIFO capacity. Specifically, the controller 114a assigns priority specified by an operating system (OS), a driver, or the like controlling the transmission unit 14b to all of the client data amount, $\Delta F$, and the FIFO capacity. Then, the controller 114a changes the threshold used in determining occurrence of the lock state and the unlock state by using one information of the client data amount, $\Delta F$, and the FIFO capacity that has the highest priority.

The controller 114a may change the threshold used in determining occurrence of the lock state and the unlock state by using one of the client data amount, $\Delta F$, and the FIFO capacity. In addition, the controller 114a may weight the client data amount, $\Delta F$, and the FIFO capacity based on priority and may change the threshold based on each information weighted.

The DPLL 115a exhibits the same function as the DPLL 115. In addition, the DPLL 115a changes the threshold used in determining occurrence of the lock state and the unlock state based on control of the controller 114a.

Figure 10:
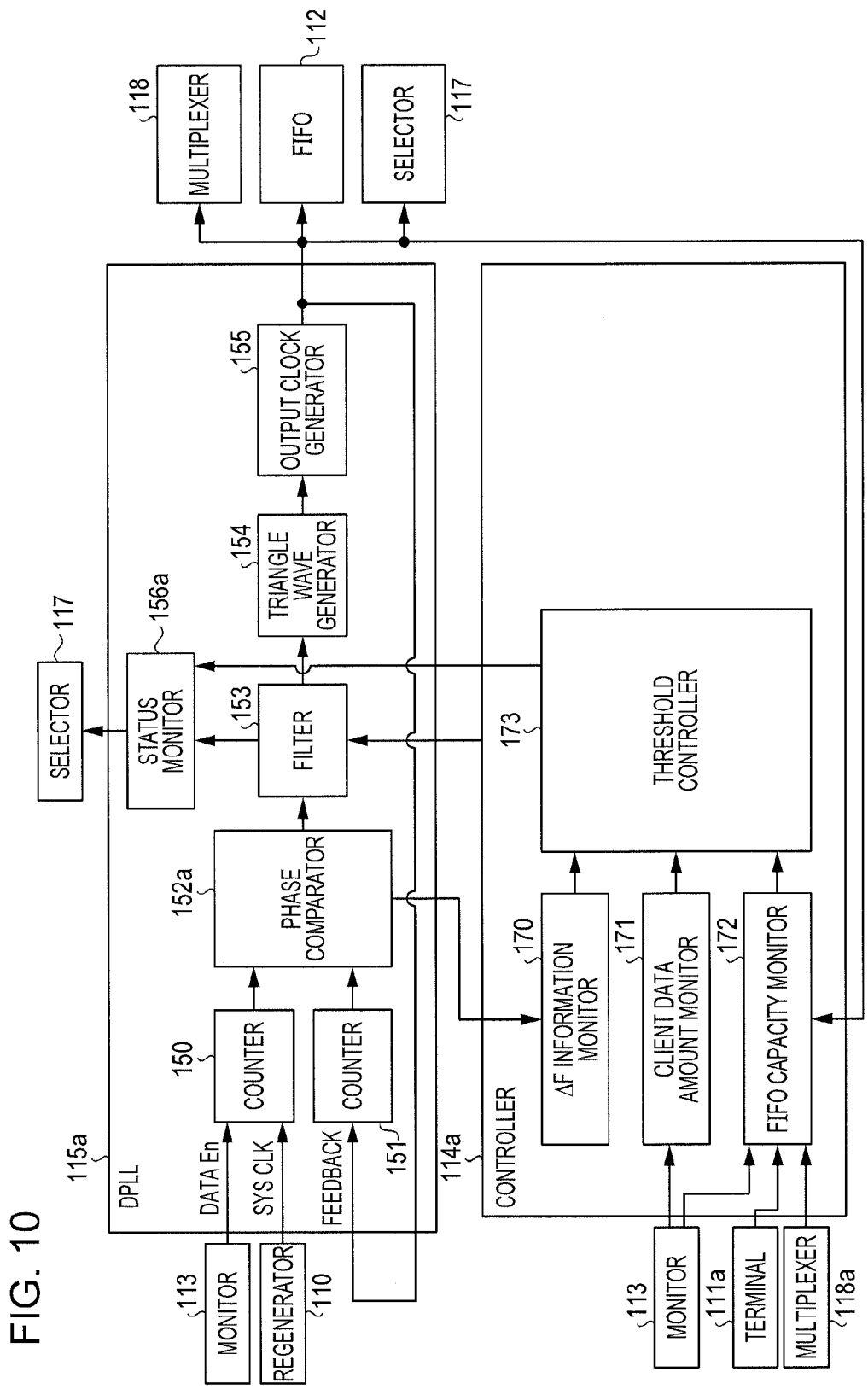
FIG. 10 is a block diagram illustrating an example of a functional configuration of a controller and a DPLL of the transmission unit.

Hereinafter, an example of a functional configuration of the controller 114a and the DPLL 115a will be described. FIG. 10 is a block diagram illustrating an example of a functional configuration of the controller 114a and the DPLL 115a of the transmission unit 14b. The controller 114a includes the functional configuration illustrated in FIG. 6 in addition to the functional configuration illustrated in FIG. 10. The same constituent of the functional configuration of the DPLL 115a as in the DPLL 115 of the first embodiment will be designated by the same reference sign, and duplicate descriptions will not be provided of the configuration and operation thereof.

The DPLL 115a illustrated in FIG. 10 includes a phase comparator 152a and a status monitor 156a instead of the phase comparator 152 and the status monitor 156. In addition, the controller 114a illustrated in FIG. 10 includes a $\Delta F$ information monitor 170, a client data amount monitor 171, a FIFO capacity monitor 172, and a threshold controller 173. Hereinafter, processing will be described in order of the phase comparator 152a, the $\Delta F$ information monitor 170, the client data amount monitor 171, the FIFO capacity monitor 172, the threshold controller 173, and the status monitor 156a.

The phase comparator 152a, for example, performs the same process as the phase comparator 152. In addition, the phase comparator 152a obtains the value of $\Delta F$ and outputs the obtained $\Delta F$ value to the $\Delta F$ information monitor 170.

The $\Delta F$ information monitor 170 receives the $\Delta F$ value from the phase comparator 152a and outputs the received $\Delta F$ value to the threshold controller 173. The client data amount monitor 171, in the same manner as the client data amount monitor 160 illustrated in FIG. 6, obtains the Cm value and the Cnd value from the monitor 113 and calculates the client data amount from the obtained Cm value and the Cnd value. Then, the client data amount monitor 171 outputs the client data amount to the threshold controller 173.

The FIFO capacity monitor 172 calculates the FIFO capacity by using WRITE DATA EN obtained from the terminal 111a and READ DATA EN obtained from the multiplexer 118a. Then, the FIFO capacity monitor 172 outputs the calculated FIFO capacity to the threshold controller 173.

The threshold controller 173 calculates the threshold used in determining occurrence of the lock state and the unlock state based on at least one information of the client data amount, $\Delta F$, and the FIFO capacity. Then, the threshold controller 173 outputs the calculated threshold to the status monitor 156a.

The status monitor 156a has the same function as the status monitor 156 illustrated in FIG. 6. In addition, the status monitor 156a determines whether the lock state or the unlock state is brought about by using the threshold received from the threshold controller 173.

Figure 11:
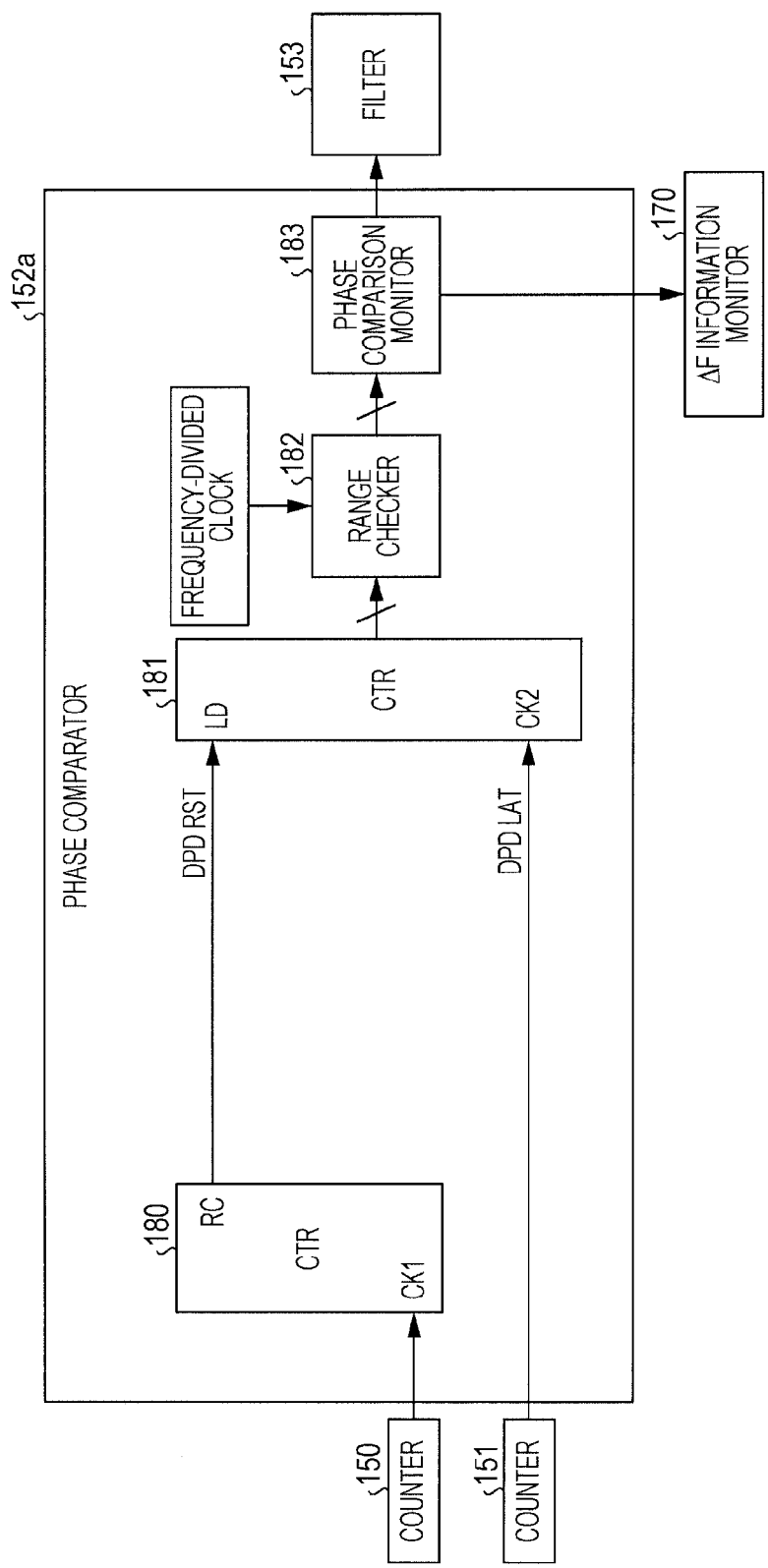
FIG. 11 is a block diagram illustrating an example of a functional configuration of a phase comparator.

Next, an example of a functional configuration of the phase comparator 152a, the FIFO capacity monitor 172, and the threshold controller 173 illustrated in FIG. 10 will be described. FIG. 11 is a block diagram illustrating an example of a functional configuration of the phase comparator 152a. The phase comparator 152a includes a CTR 180, a CTR 181, a range checker 182, and a phase comparison monitor 183.

The CTR 180 is a counter that counts the number counted by the counter 150 at all times. The CTR 180 inputs a fall signal as DPD RST into the load terminal (LD) of the CTR 181 in a case where the counted value is equal to "8192 (eight kilobytes)".

Figure 12:
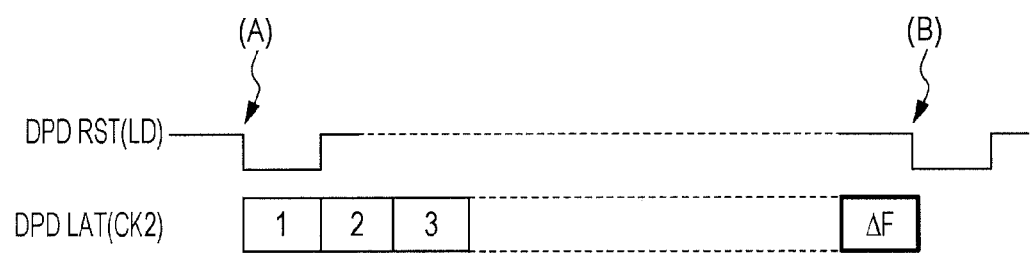
FIG. 12 is a diagram illustrating an example of a process of calculating $\Delta F$ performed by the phase comparator.

The CTR 181 is a counter in which DPD RST and a signal DPD LAT that indicates the value counted by the counter 151 are respectively input into the load terminal (LD) and the clock terminal (CK2) thereof. FIG. 12, for example, is a diagram illustrating an example of a process of calculating ΔF performed by the phase comparator. As illustrated in the part (A) of FIG. 12, the CTR 181 counts the number of pulses of DPD LAT when detecting a fall of DPD RST. Then, the CTR 181, when detecting a subsequent fall of the DPD RST signal as illustrated in the part (B) of FIG. 12, outputs the value that is counted until the detection as the ΔF value.

Returning to FIG. 11, the range checker 182 determines whether the ΔF value output by the CTR 181 falls within a predetermined range at a timing indicated by a frequency-divided clock into which the output clock generated is frequency-divided. Then, the range checker 182 outputs the ΔF value to the phase comparison monitor 183 in a case where the ΔF value falls within the predetermined range. Meanwhile, the range checker 182 outputs a previously output ΔF value again to the phase comparison monitor 183 in a case where the ΔF value does not fall within the predetermined range.

The phase comparison monitor 183 latches the ΔF value output by the range checker 182. Then, the phase comparison monitor 183 outputs the latched ΔF value to the filter 153 and to the ΔF information monitor 170.

Figure 13:
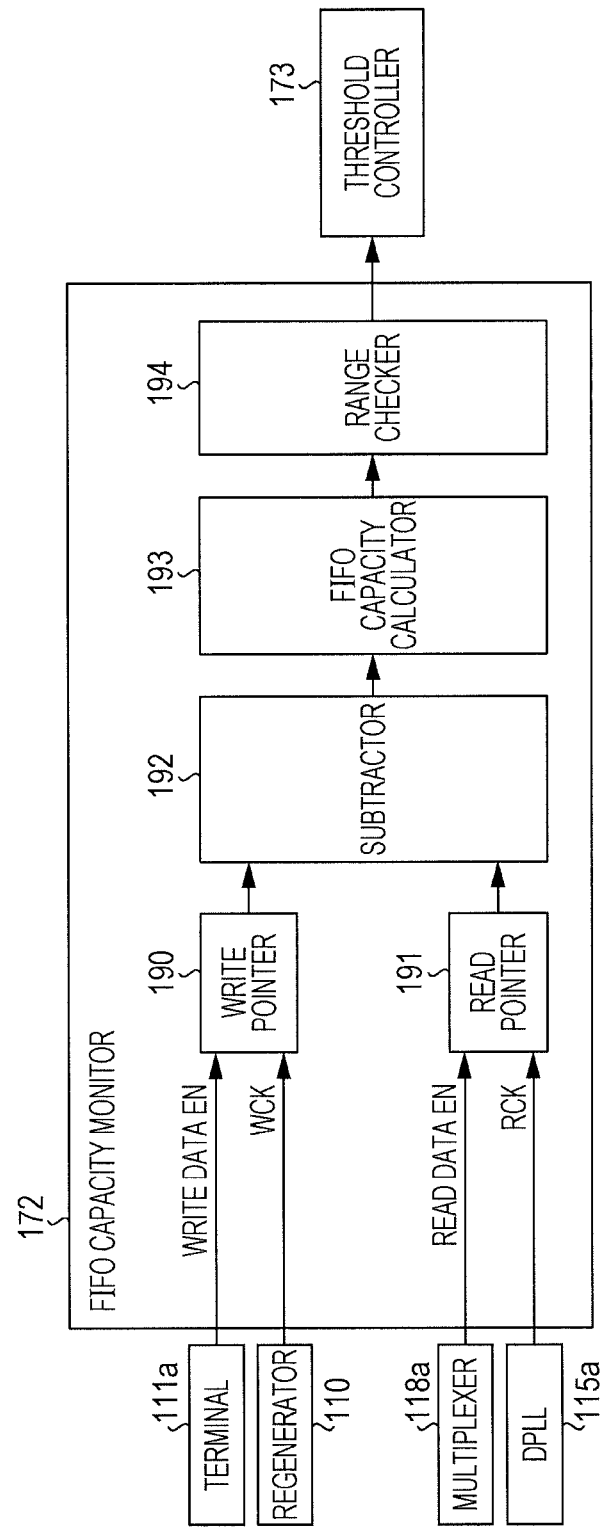
FIG. 13 is a block diagram illustrating an example of a functional configuration of a FIFO capacity monitor.

Next, an example of a functional configuration of the FIFO capacity monitor 172 will be described. FIG. 13 is a block diagram illustrating an example of a functional configuration of the FIFO capacity monitor 172. The FIFO capacity monitor 172 illustrated in FIG. 13 includes a write pointer 190, a read pointer 191, a subtractor 192, a FIFO capacity calculator 193, and a range checker 194.

The write pointer 190 is a pointer that indicates a starting address for writing data into the FIFO 112. For example, the write pointer 190 is a counter that performs counting at pulses of WCK received from the regenerator 110 with WRITE DATA EN received from the terminal 111a as an enable signal.

The read pointer 191 is a pointer that indicates a starting address for reading data from the FIFO 112. The read pointer 191 is a counter that performs counting based on the output clock (RCK) generated by the DPLL 115a with READ DATA EN received from the multiplexer 118a as an enable signal.

The subtractor 192 calculates a value resulting from subtracting the starting address indicated by the write pointer 190 from the starting address indicated by the read pointer 191 and outputs the calculated value to the FIFO capacity calculator 193.

The FIFO capacity calculator 193 calculates the FIFO capacity by using the value calculated by the subtractor 192. For example, the FIFO capacity calculator 193 calculates the sum of the amount of data that may be stored in a storage area indicated by one address in the storage area of the FIFO 112 and the value calculated by the subtractor 192 as the FIFO capacity.

The range checker 194 determines whether the FIFO capacity calculated by the FIFO capacity calculator 193 falls within a predetermined range. Then, the range checker 194 outputs the calculated FIFO capacity to the threshold controller 173 in a case where the FIFO capacity falls within the predetermined range. Meanwhile, the range checker 194 outputs a previously output FIFO capacity value again to the threshold controller 173 in a case where the calculated FIFO capacity does not fall within the predetermined range.

Figure 14:
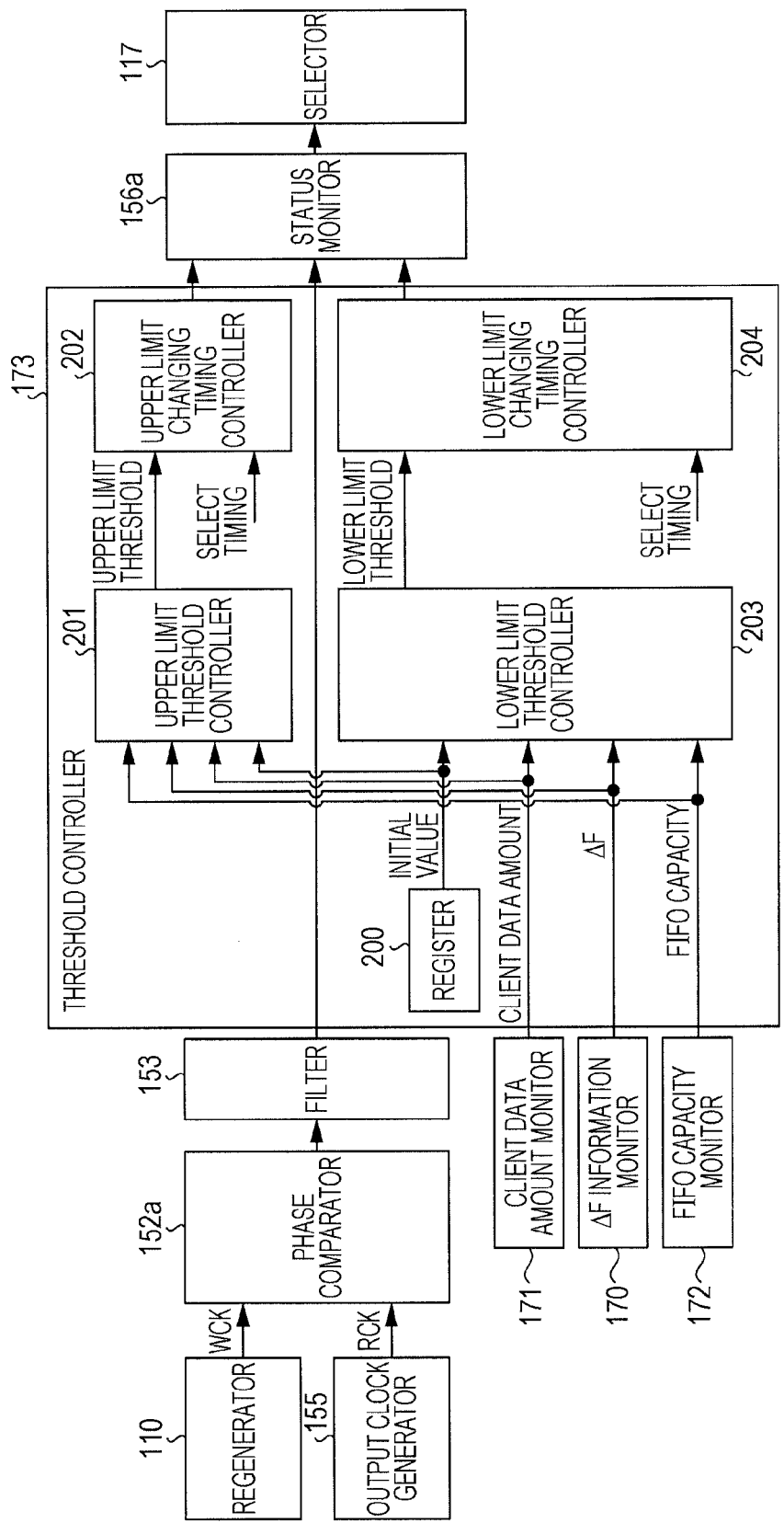
FIG. 14 is a block diagram illustrating an example of a functional configuration of a threshold controller.

Next, an example of a functional configuration of the threshold controller 173 will be described. FIG. 14 is a block diagram illustrating an example of a functional configuration of the threshold controller 173. In the example illustrated in FIG. 14, the threshold controller 173 includes a register 200, an upper limit threshold controller 201, an upper limit changing timing controller 202, a lower limit threshold controller 203, and a lower limit changing timing controller 204.

The register 200 stores the initial upper limit and lower limit values of the phase difference that are used in determining occurrence of the lock state performed by the status monitor 156a. In the description below, the upper limit of the phase difference in determining occurrence of the lock state will be referred to as an upper limit threshold, and the lower limit of the phase difference in determining occurrence of the lock state will be referred to as a lower limit threshold.

The upper limit threshold controller 201 calculates the upper limit threshold based on the initial value of the upper limit threshold, the client data amount, the ΔF value, and the FIFO capacity. For example, the upper limit threshold controller 201 obtains the initial value from the register 200 and obtains the client data amount from the client data amount monitor 171. In addition, the upper limit threshold controller 201 obtains the ΔF value from the ΔF information monitor 170 and obtains the FIFO capacity from the FIFO capacity monitor 172.

The upper limit threshold controller 201 determines whether each of the client data amount, the ΔF value, and the FIFO capacity obtained falls within a predetermined range and outputs the initial value of the upper limit threshold in a case where each thereof falls within the predetermined range. Meanwhile, the upper limit threshold controller 201 outputs a value resulting from correcting the initial value of the upper limit in a case where at least one of the client data amount, the ΔF value, and the FIFO capacity obtained does not fall within the predetermined range. For example, the upper limit threshold controller 201 outputs a value that is greater than the initial value as the upper limit threshold in a case where the FIFO capacity is greater than the upper limit of the predetermined range.

The upper limit changing timing controller 202 updates the upper limit threshold calculated by the upper limit threshold controller 201 at a predetermined time interval. For example, the upper limit changing timing controller 202 latches the upper limit threshold output by the upper limit threshold controller 201 and outputs the latched upper limit threshold to the status monitor 156a. In addition, a timing selection signal that indicates a time interval to update the upper limit threshold is input into the upper limit changing timing controller 202 from the OS, the driver, or the like controlling the transmission unit 14b. Then, the upper limit changing timing controller 202 again latches the upper limit threshold output by the upper limit threshold controller 201 at the time interval indicated by the timing selection signal.

The lower limit threshold controller 203 calculates the lower limit threshold based on the initial value of the lower limit threshold, the client data amount, the ΔF value, and the FIFO capacity. Processing and a functional configuration of the lower limit threshold controller 203 for calculating the lower limit threshold are the same as the processing and the functional configuration of the upper limit threshold controller 201 for controlling the upper limit threshold and thus will not be described hereinafter.

The lower limit changing timing controller 204 updates the lower limit threshold calculated by the lower limit threshold controller 203 at a predetermined time interval. Processing and a functional configuration of the lower limit changing timing controller 204 are the same as the processing and the functional configuration of the upper limit changing timing controller 202 and thus will not be described hereinafter.

Figure 15:
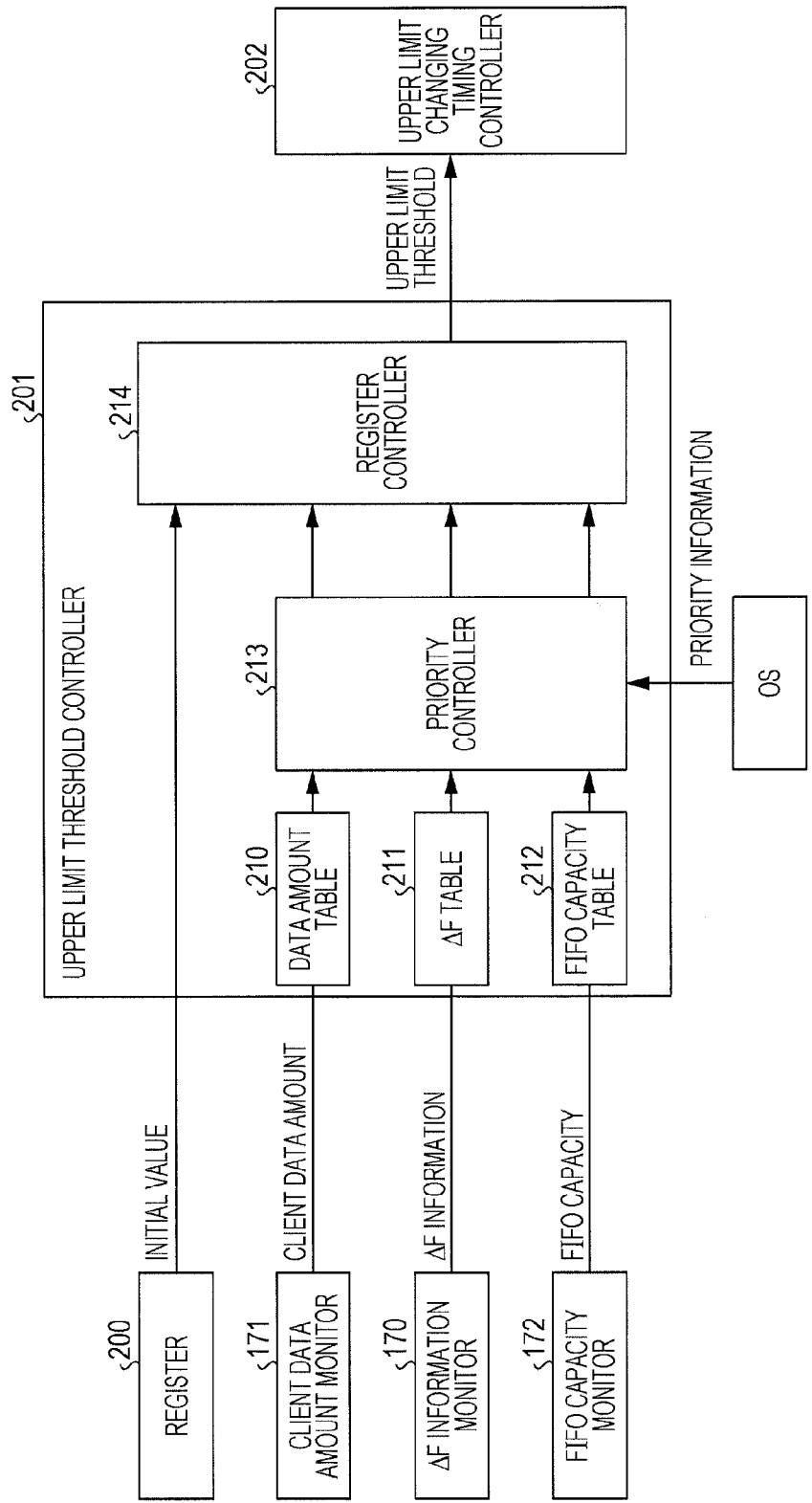
FIG. 15 is a block diagram illustrating an example of a functional configuration of an upper limit threshold controller.

Next, an example of a functional configuration of the upper limit threshold controller 201 will be described. FIG. 15 is a block diagram illustrating an example of a functional configuration of the upper limit threshold controller 201. In the example illustrated in FIG. 15, the upper limit threshold controller 201 includes a data amount table 210, a ΔF table 211, a FIFO capacity table 212, a priority controller 213, and a register controller 214.

The data amount table 210 outputs a hexadecimal value that corresponds to the client data amount obtained from the client data amount monitor 171. The ΔF table 211 outputs a hexadecimal value that corresponds to the ΔF value obtained from the ΔF information monitor 170. The FIFO capacity table 212 outputs a hexadecimal value that corresponds to the FIFO capacity value obtained from the FIFO capacity monitor 172.

FIG. 16, for example, is a table illustrating an example of output values for given client data amounts. As illustrated in FIG. 16, the client data amount table 210 stores the client data amount in association with a hexadecimal output and outputs the hexadecimal value that is associated with the input client data amount.

The client data amount table 210, for example, outputs "0h88" in a case where the client data amount falls within a range of "15240" bytes±less than 5 bytes. The client data amount table 210 outputs a value resulting from adding one to "0h88" each time the client data amount increases by "5" bytes from "15240" bytes. The client data amount table 210 outputs a value resulting from subtracting one from "0h88" each time the client data amount decreases by "5" bytes from "15240" bytes.

FIG. 17 is a table illustrating an example of output values for given ΔF values. As illustrated in FIG. 17, the ΔF table 211 stores a ΔF change in association with a hexadecimal output and outputs the hexadecimal value that is associated with the input ΔF change.

The ΔF table 211, for example, outputs "0h88" in a case where the ΔF change is equal to "0" and outputs a value resulting from adding one to "0h88" each time the ΔF change increases by "1" from "0". The ΔF table 211 outputs a value resulting from subtracting one from "0h88" each time the ΔF change decreases by "1" from "0".

FIG. 18 is a table illustrating an example of output values for given FIFO capacities. As illustrated in FIG. 18, the FIFO capacity table 212 stores the FIFO capacity (in bits) in association with a hexadecimal output and outputs the hexadecimal value that is associated with the input FIFO capacity.

The FIFO capacity table 212, for example, outputs "0h88" in a case where the FIFO capacity falls within a range of "2048" bits±less than 100 bits. The FIFO capacity table 212 outputs a value resulting from adding one to "0h88" each time the FIFO capacity increases by "100" bits from "2048" bits. The FIFO capacity table 212 outputs a value resulting from subtracting one from "0h88" each time the FIFO capacity decreases by "100" bits from "2048" bits.

As such, the transmission unit 14b rounds the client data amount, the phase difference, and the FIFO capacity based on the tables. Thus, the transmission unit 14b may reduce influence of a rapid change in each information.

Description will continue returning to FIG. 15. The priority controller 213 obtains information that indicates priority assigned to all of the client data amount, the ΔF value, and the FIFO capacity from the OS or the like. Then, the priority controller 213 assigns priority to the values output by the data amount table 210, the ΔF table 211, and the FIFO capacity table 212 and outputs the values.

Figure 19:
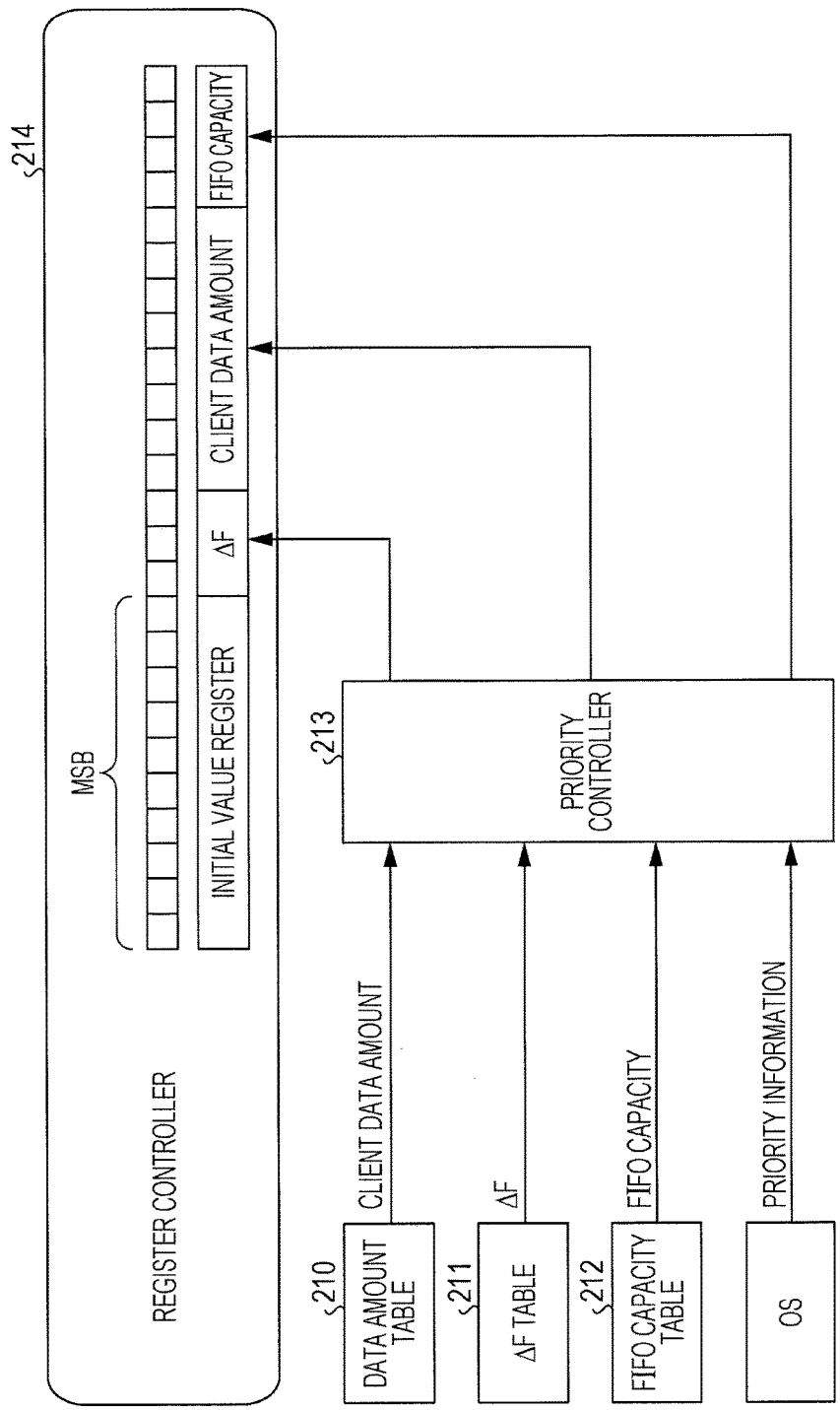
FIG. 19 is a diagram illustrating an example of a process performed by a priority controller.

FIG. 19, for example, is a diagram illustrating an example of a process performed by the priority controller. The priority controller 213, for example, stores an initial value at the most significant bit (MSB) in a register of the register controller 214. In addition, the priority controller 213 stores the values output by the data amount table 210, the ΔF table 211, and the FIFO capacity table 212 in order of priority at bits below MSB.

The priority controller 213, for example, stores the value output by the ΔF table 211 next to the initial value in a case where priority is assigned in order of the ΔF value, the client data amount, and the FIFO capacity. In addition, the priority controller 213 stores the client data amount output by the data amount table 210 next to the ΔF value and stores the FIFO capacity output by the FIFO capacity table 212 next to the client data amount. Then, the register controller 214 outputs the client data amount, the ΔF value, and the FIFO capacity as the upper limit threshold to the upper limit changing timing controller 202.

Figure 20:
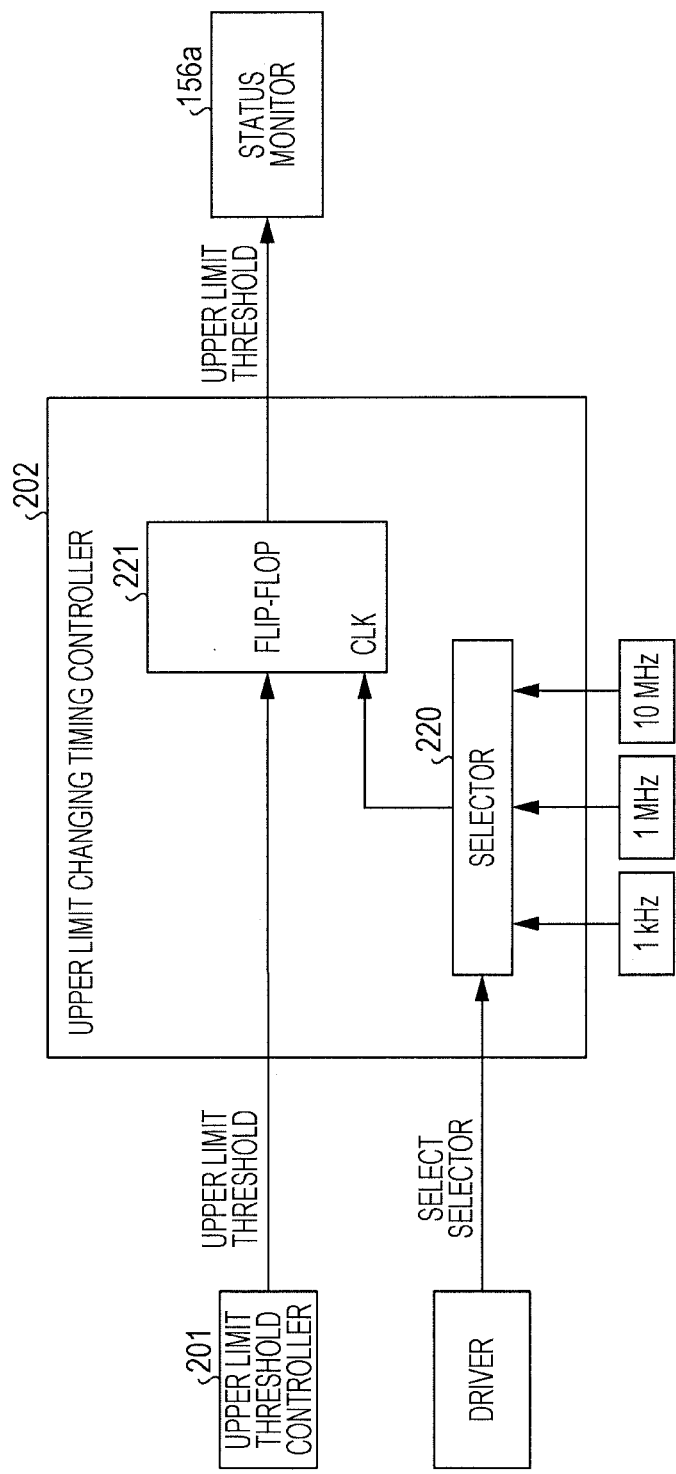
FIG. 20 is a block diagram illustrating an example of a functional configuration of an upper limit changing timing controller.

Next, an example of a functional configuration of the upper limit changing timing controller 202 will be described. FIG. 20 is a block diagram illustrating an example of a functional configuration of the upper limit changing timing controller 202. As illustrated in FIG. 20, the upper limit changing timing controller 202 includes a selector 220 and a flip-flop 221.

Clock signals of 1 kHz (kilohertz), 1 MHz (megahertz), and 10 MHz, for example, are input into the selector 220. Then, the selector 220 outputs one of the input clock signals to the flip-flop 221 based on an instruction from the OS or the driver controlling the transmission unit 14b. For example, the OS that controls the transmission unit 14b monitors the stability of a transmission path and selects a clock having a long cycle if the transmission path is stable such as in a case where a change in the client data amount, ΔF, and the FIFO capacity is stable.

The flip-flop 221 latches the upper limit threshold output by the upper limit threshold controller 201 at a timing indicated by the clock signal output by the selector 220. Then, the flip-flop 221 outputs the latched upper limit threshold to the status monitor 156a.

Figure 21:
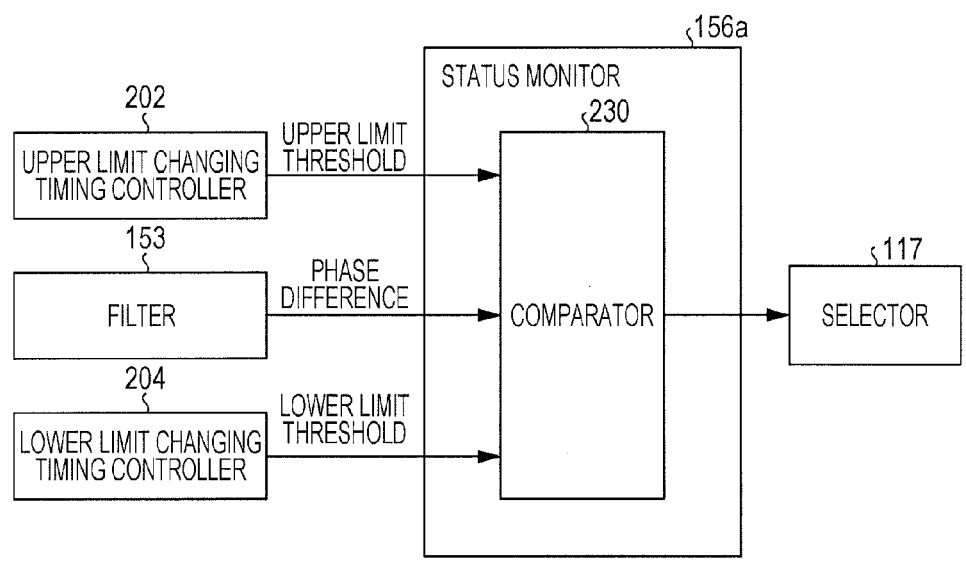
FIG. 21 is a diagram illustrating an example of a functional configuration of a status monitor.

Next, an example of a functional configuration of the status monitor 156a will be described by using FIG. 21. FIG. 21 is a diagram illustrating an example of a functional configuration of the status monitor 156a. As illustrated in FIG. 21, the status monitor 156a includes a comparator 230.

The comparator 230 obtains the upper limit threshold from the upper limit changing timing controller 202 and obtains the lower limit threshold from the lower limit changing timing controller 204. In addition, the comparator 230 obtains the phase difference calculated by the phase comparator 152a through the filter 153. Then, the comparator 230 determines whether the obtained phase difference value is greater than or equal to the lower limit threshold and less than or equal to the upper limit threshold.

The comparator 230 outputs a signal indicating selection of the output clock generated by the DPLL 115a to the selector 117 in a case where the obtained phase difference value is greater than or equal to the lower limit threshold and less than or equal to the upper limit threshold. Meanwhile, the comparator 230 outputs a signal indicating selection of the clock generated by the oscillator 116 to the selector 117 in a case where the phase difference is greater than the upper limit threshold or is less than the lower limit threshold.

Figure 22:
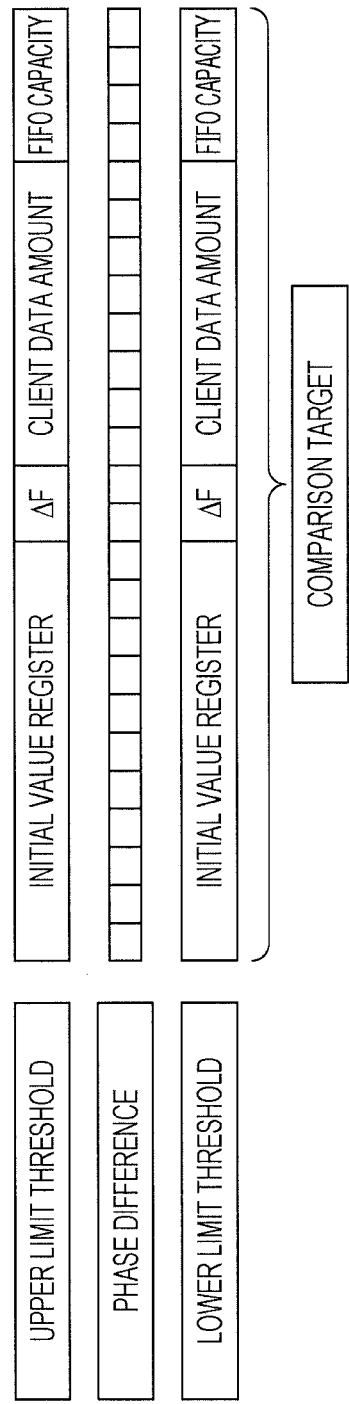
FIG. 22 is a diagram illustrating an example of operation of a comparator.

FIG. 22 is a diagram illustrating an example of operation of the comparator 230. The comparator 230, for example, includes a register storing the upper limit threshold, a register storing the phase difference, and a register storing the lower limit threshold. The register storing the upper limit threshold and the register storing the lower limit threshold store the initial value, the ΔF value, the client data amount, and the FIFO capacity. The comparator 230 determines whether the phase difference is greater than or equal to the lower limit threshold and less than or equal to the upper limit threshold by comparing the values stored in each register. For example, the comparator 230 corrects the initial values of the upper limit threshold and the lower limit threshold with the ΔF value, the client data amount, and the FIFO capacity and compares the phase difference with each corrected initial value of the upper limit threshold and the lower limit threshold.

As such, the transmission unit 14b changes the threshold used in determining occurrence of the lock state and the unlock state based on at least one information of the client data amount, ΔF, and the FIFO capacity. As a consequence, the transmission unit 14b may reduce occurrence of the unlock state and output of a signal indicating error even in a case where clock distortion occurs in the transmission unit that is the transmission source of the client data and the Cm value or the Cn value rapidly changes in a short period of time.

Figure 23:
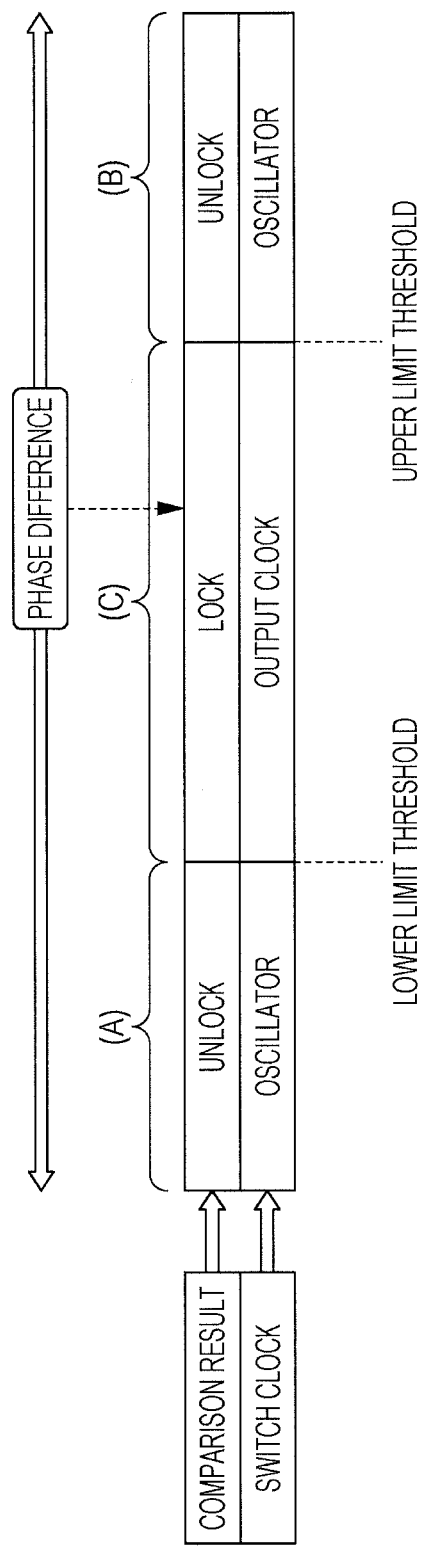
FIG. 23 is a diagram illustrating an example of lock control of the related art.

FIG. 23, for example, is a diagram illustrating an example of lock control of the related art. An optical transmission device of the related art, for example, determines that an unlock state is brought about and selects a clock generated by an oscillator in a case where a phase difference is less than a lower limit threshold as illustrated in the part (A) of FIG. 23 or in a case where a phase difference is greater than an upper limit threshold as illustrated in the part (B) of FIG. 23. In addition, the optical transmission device of the related art determines that the lock state is brought about and selects an output clock generated by a DPLL in a case where the phase difference is greater than or equal to the lower limit threshold and less than or equal to the upper limit threshold as illustrated in the part (C) of FIG. 23.

The phase difference, however, is calculated based on the Cm value and the Cn value. Thus, when the Cm value or the Cn value significantly fluctuates in a short period of time, the phase difference exceeds the range between the lower limit threshold and the upper limit threshold, thereby causing error.

Figure 24:
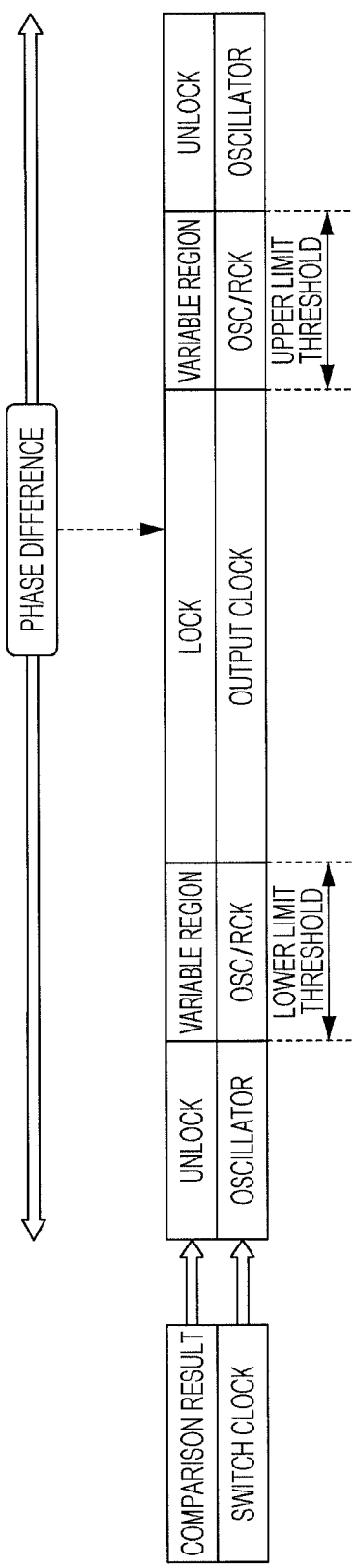
FIG. 24 is a diagram illustrating an operation of changing thresholds performed by the transmission unit.

Meanwhile, FIG. 24 is a diagram illustrating an operation of changing thresholds performed by the transmission unit 14b. The text "OSC" in FIG. 24 indicates an oscillator, and the text "RCK" indicates an output clock. The transmission unit 14b, for example, allows the lower limit threshold and upper limit threshold values to vary within a range based on the client data amount, the ΔF value, the FIFO capacity, and the like as illustrated in FIG. 24. Thus, the transmission unit 14b may reduce unreasonable occurrence of the unlock state and may reduce occurrence of error.

Figure 25:
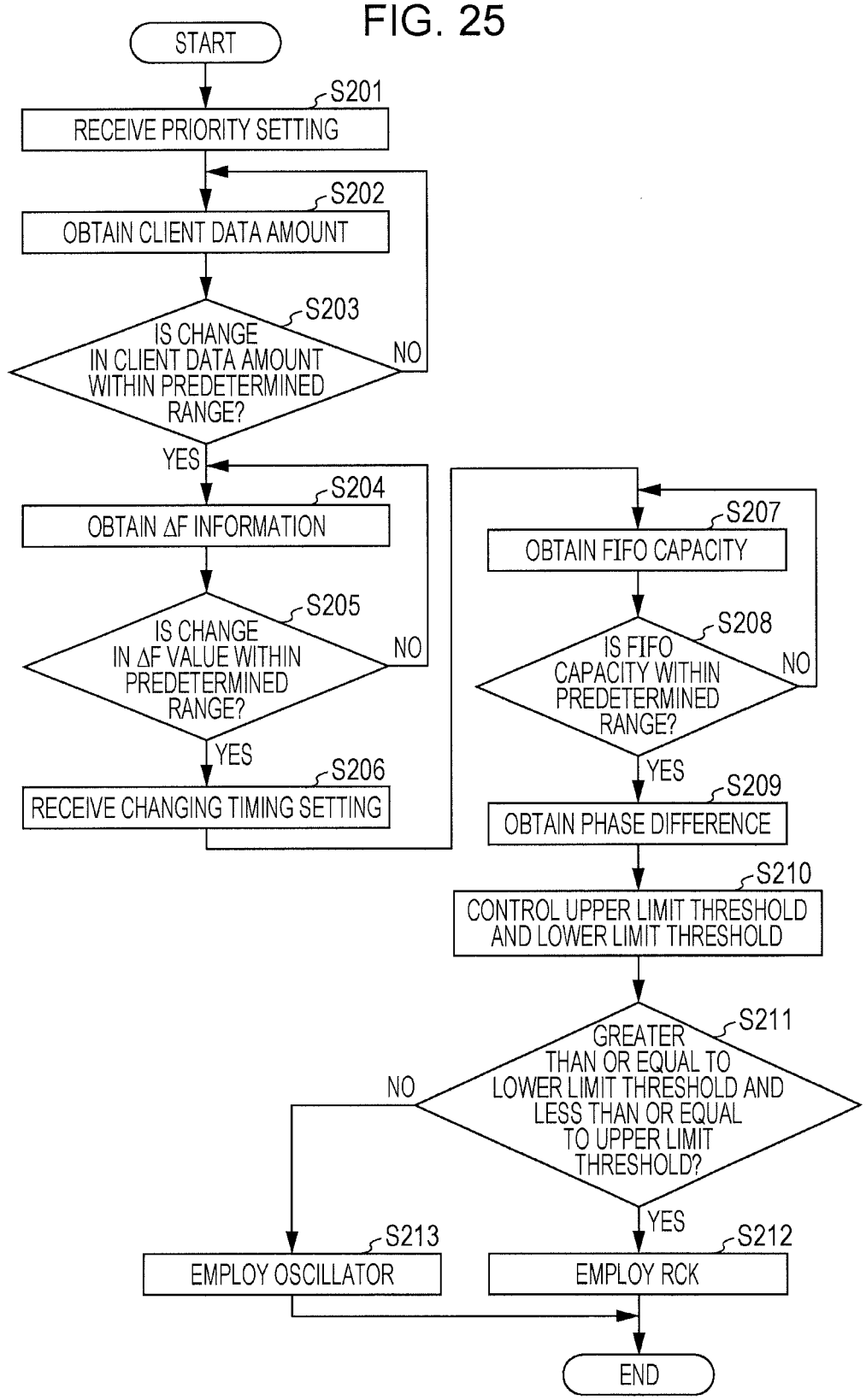
FIG. 25 is a flowchart illustrating an example of an operation of checking whether a phase difference is within a predetermined range.

Next, operation of the transmission unit 14b of the present embodiment will be described. FIG. 25 is a flowchart illustrating an example of an operation of checking whether the phase difference is within a predetermined range. For example, the transmission unit 14b receives a priority setting from the OS or the like (operation S201). Next, the transmission unit 14b obtains the client data amount (operation S202).

The transmission unit 14b determines whether a change in the client data amount is within a predetermined range (operation S203). Then, the transmission unit 14b obtains the ΔF information (operation S204) in a case where the client data amount is within the predetermined range (positive in operation S203).

The transmission unit 14b determines whether a change in the ΔF value is within a predetermined range (operation S205) and receives a changing timing to control the upper limit threshold and the lower limit threshold (operation S206) in a case where the change is within the predetermined range (positive in operation S205).

The transmission unit 14b obtains the FIFO capacity (operation S207) and determines whether the FIFO capacity is within a predetermined range (operation S208). Then, the transmission unit 14b obtains the phase difference (operation S209) in a case where the FIFO capacity is within the predetermined range (positive in operation S208). Then, the transmission unit 14b controls the upper limit threshold and the lower limit threshold based on at least one of the client data amount, the ΔF value, and the FIFO capacity (operation S210).

The transmission unit 14b determines whether the obtained phase difference is greater than or equal to the lower limit threshold and less than or equal to the upper limit threshold (operation S211). Then, the transmission unit 14b employs the output clock (RCK) generated by the DPLL 115a (operation S212) in a case where the obtained phase difference is greater than or equal to the lower limit threshold and less than or equal to the upper limit threshold (positive in operation S211) and ends the process. Meanwhile, the transmission unit 14b employs the clock generated by the oscillator 116 (operation S213) in a case where the obtained phase difference is less than the lower limit threshold or is greater than the upper limit threshold (negative in operation S211) and ends the process.

The transmission unit 14b returns to operation S202 in a case where the change in the client data amount exceeds the predetermined range (negative in operation S203). The transmission unit 14b returns to operation S204 in a case where the change in the ΔF value is not within the predetermined range (negative in operation S205). The transmission unit 14b returns to operation S207 in a case where the FIFO capacity is not within the predetermined range (negative in operation S208).

The transmission unit 14b that performs the process illustrated in FIG. 25 changes the upper limit threshold and lower limit threshold values based on at least one of the client data amount, the ΔF value, and the FIFO capacity. Thus, the transmission unit 14b, for example, may reduce occurrence of error when the transmission unit 14b, by controlling the frequency of the output clock, may counteract a case where clock distortion occurs in the transmission unit 14a and the phase difference exceeds the range between the initial upper limit threshold value and the initial lower limit threshold value. As a consequence, the transmission unit 14b may reduce unnecessary occurrence of error.

Figure 26:
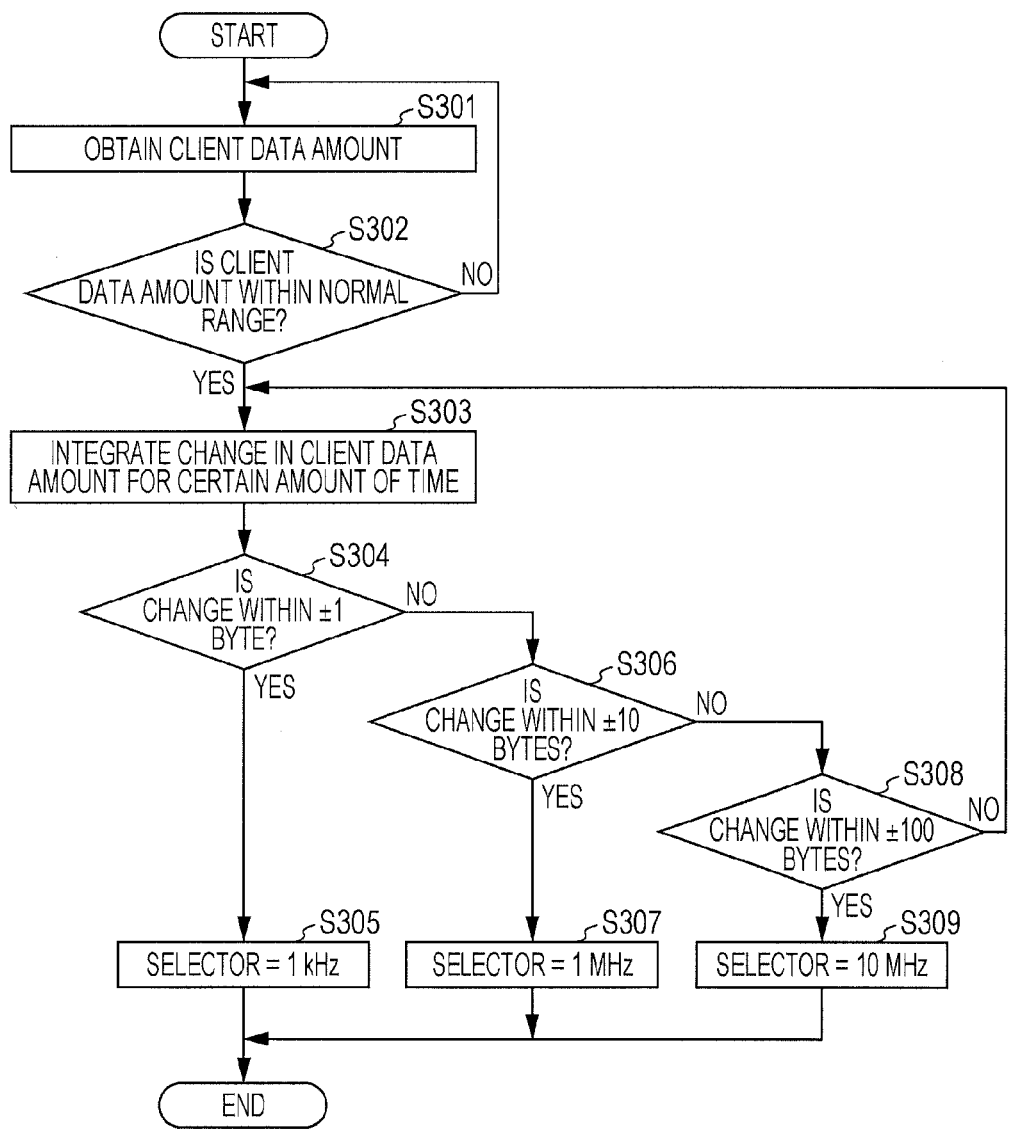
FIG. 26 is a flowchart illustrating an example of an operation of setting a changing timing.

Next, the flow of a process of setting the changing timing performed by the OS or the like will be described. FIG. 26 is a flowchart illustrating an example of an operation of setting the changing timing. The process illustrated in FIG. 26 is realized by the OS, the driver, or the like controlling the transmission unit 14b.

The OS, for example, obtains the client data amount received by the transmission unit 14b (operation S301). Next, the OS determines whether the client data amount is within a normal range (operation S302).

The OS integrates a change in the client data amount for a certain period of time (operation S303) in a case where the client data amount is determined to be within the normal range (positive in operation S302). Next, the OS determines whether the integrated change falls within a range of ±1 byte (operation S304), instructs the selector 220 to select the 1 kHz clock (operation S305) in a case where the integrated change falls within the range (positive in operation S304), and ends the process.

Meanwhile, the OS determines whether the integrated change falls within a range of ±10 bytes (operation S306) in a case where the integrated change does not fall within the range of ±1 byte (negative in operation S304). Then, the OS instructs the selector 220 to select the 1 MHz clock (operation S307) in a case where the integrated change falls within the range of ±10 bytes (positive in operation S306) and ends the process.

Meanwhile, the OS determines whether the integrated change falls within a range of ±100 bytes (operation S308) in a case where the integrated change does not fall within the range of ±10 bytes (negative in operation S306). Then, the OS instructs the selector 220 to select the 10 MHz clock (operation S309) in a case where the integrated change falls within the range of ±100 bytes (positive in operation S308) and ends the process.

The OS returns to operation S303 in a case where the integrated change does not fall within the range of ±100 bytes (negative in operation S308). The OS returns to operation S301 in a case where the client data amount is not within the normal range (negative in operation S302).

Changing the upper limit threshold or the lower limit threshold at high speed destabilizes operation of the status monitor 156a and causes frequent switching between the lock state and the unlock state, in which case operation of the transmission unit 14b may become unstable. However, the transmission unit 14b that uses the timing set by the process illustrated in FIG. 26, for example, may switch the timing of changing the thresholds based on the stability of the network 30. As a consequence, the transmission unit 14b, for example, may reduce unstable operation in which frequent switching occurs between the lock state and the unlock state.

The transmission unit 14b, as described above, determines whether the phase difference falls within a predetermined range. Then, the transmission unit 14b selects the output clock generated and outputs the client data based on the selected output clock in a case where the phase difference falls within the predetermined range. Meanwhile, the transmission unit 14b selects the clock caused to oscillate by the oscillator 116 and outputs a signal indicating occurrence of error based on the selected clock in a case where the phase difference does not fall within the predetermined range.

The transmission unit 14b controls at least one of the upper limit threshold and the lower limit threshold within a predetermined range based on the client data amount. Thus, for example, even if clock distortion occurs in the counterpart transmission unit, the transmission unit 14b may control either the upper limit threshold or the lower limit threshold based on the client data amount that changes earlier than the occurrence of the phase difference, thereby being capable of reducing occurrence of error.

The transmission unit 14b controls at least one of the upper limit threshold and the lower limit threshold within a predetermined range based on the phase difference such as ΔF. Thus, for example, even if clock distortion occurs in the counterpart transmission unit and causes a phase difference, the transmission unit 14b may reduce unreasonable occurrence of error.

The transmission unit 14b controls at least one of the upper limit threshold and the lower limit threshold within a predetermined range based on the FIFO capacity. Thus, for example, even if clock distortion occurs in the transmission unit 14a and causes a phase difference, the transmission unit 14b reduces occurrence of error when the FIFO capacity is sufficient and thus may reduce unreasonable occurrence of error.

The transmission unit 14b assigns priority to all of the client data amount, the phase difference, and the FIFO capacity and controls at least one of the upper limit threshold and the lower limit threshold within a predetermined range based on the priority. Thus, the transmission unit 14b, for example, may select information that is used in controlling the upper limit threshold or the lower limit threshold within a predetermined range according to a line speed or the speed of propagation of a clock that depends on the number of relays.

Third Embodiment

While embodiments are described thus far, embodiments may be carried out in various different forms other than the embodiments described above. Therefore, hereinafter, another embodiment will be described as a third embodiment.

In the above description, the transmission unit 14b controls the upper limit threshold and the lower limit threshold by using the client data amount, the phase difference, and the FIFO capacity. However, embodiments are not limited thereto. For example, the transmission unit 14b may monitor only one of the client data amount, the phase difference, and the FIFO capacity and control the upper limit threshold and the lower limit threshold based on the monitored information.

The transmission unit 14b may control only one of the upper limit threshold and the lower limit threshold. In addition, the transmission unit 14b may control the upper limit threshold and the lower limit threshold by using different information. In addition, the transmission unit 14b may control the upper limit threshold and the lower limit threshold based on information to which different priority is assigned.

The transmission unit 14b described above uses the values of the registers storing the initial value, the client data amount, the phase difference, and the FIFO capacity as the upper limit threshold and the lower limit threshold. However, embodiments are not limited thereto. For example, the transmission unit 14b may actually calculate the upper limit and lower limit values by using the initial value, the client data amount, the phase difference, and the FIFO capacity and determine whether the phase difference is greater than or equal to the lower limit threshold and less than or equal to the upper limit threshold.

A part or the entirety of a process, of the processes described above, that is described as being automatically performed may be manually performed. Alternatively, a part or the entirety of a process that is described as being manually performed may be automatically performed in a known method. Besides, information that includes procedures, specific names, and various data and parameters illustrated herein and in the drawings may be arbitrarily changed unless otherwise specified.

Each element of each device illustrated is a functional concept and does not have to be physically configured as illustrated in the drawings. That is, a specific form of distribution or integration of each device is not limited to the illustrations. That is, a part or the entirety thereof may be distributed or integrated either functionally or physically in arbitrary units according to various types of load, status of usage, and the like.

An arbitrary part or the entirety of each processing function performed by each device may be realized by a CPU and a program interpreted by the CPU or may be realized by wired hardware logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a receiver configured to receive a signal including data;
   a generator configured to generate an output clock to output the data based on a signal clock synchronized with the signal; and
   a controller configured to control a frequency of the output clock based on a first amount of the data so that the output clock follows a clock of a transmission source of the data, the controller being configured to increase or decrease the frequency of the output clock based on whether the first amount of the data is increased or decreased from a previous amount thereof.

2. The optical transmission device according to claim 1, wherein the generator includes
   a calculator configured to calculate a phase difference between the signal clock and the output clock from a difference between a frequency resulting from multiplying a proportion of the data to the signal by a frequency of the signal clock and the frequency of the output clock, and
   a changer configured to change the frequency of the output clock based on predetermined characteristics with respect to the phase difference, and
   wherein the controller controls the predetermined characteristics based on the first amount of the data.

3. The optical transmission device according to claim 2, wherein the generator further includes
   a determiner configured to determine whether the phase difference falls within a predetermined range;
   a selector configured to select the output clock in a case where the phase difference falls within the predetermined range, or select an oscillating clock oscillated by a predetermined oscillator in a case where the phase difference does not fall within the predetermined range; and
   an outputter configured to output the data based on the output clock in a case where the selector selects the output clock, or output an error signal based on the oscillating clock in a case where the selector selects the oscillating clock,
   wherein the controller controls at least one of an upper limit and a lower limit of the predetermined range based on the first amount of the data.

4. The optical transmission device according to claim 3, wherein the controller controls at least one of the upper limit and the lower limit of the predetermined range based on the phase difference.

5. The optical transmission device according to claim 3, wherein the generator further includes
   a storage configured temporarily store the data,
   wherein the controller controls at least one of the upper limit and the lower limit of the predetermined range based on a second amount of the data stored in the storage.

6. The optical transmission device according to claim 5, wherein the controller assigns priority to the first amount of the data, the phase difference, and the second amount of the data stored in the storage and controls at least one of the upper limit and the lower limit of the predetermined range based on the priority.

7. The optical transmission device according to claim 1, wherein the controller increases the frequency of the output clock when the first amount of the data is increased from a previous amount thereof and decreases the frequency of the output clock when the first amount of the data is decreased from the previous amount thereof.

8. An optical transmission control method comprising:
   generating an output clock based on a signal clock synchronized with a signal including data, the data being output synchronizing with the output clock; and
   controlling a frequency of the output clock based on an amount of the data so that the output clock follows a clock of a transmission source of the data, the frequency of the output clock being increased or decreased based on whether the amount of the data is increased or decreased from a previous amount thereof.

* * * * *